(12) United States Patent
Izaki et al.

(10) Patent No.: US 11,841,608 B2
(45) Date of Patent: Dec. 12, 2023

(54) ELECTRONIC APPARATUS TO WHICH ACCESSORY IS ATTACHABLE, AND ACCESSORY

(71) Applicant: CANON KABUSHIKI KAISHA, Tokyo (JP)

(72) Inventors: Yuko Izaki, Kanagawa (JP); Hiromichi Sakamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 17/718,527

(22) Filed: Apr. 12, 2022

(65) Prior Publication Data

US 2022/0342287 A1 Oct. 27, 2022

(30) Foreign Application Priority Data

Apr. 23, 2021 (JP) .................................. 2021-073486

(51) Int. Cl.
*G03B 17/56* (2021.01)
*H04N 23/661* (2023.01)

(52) U.S. Cl.
CPC .......... *G03B 17/566* (2013.01); *H04N 23/661* (2023.01)

(58) Field of Classification Search
CPC .............................. G03B 17/566; H04N 23/661
See application file for complete search history.

(56) References Cited

U.S. PATENT DOCUMENTS

| 10,976,644 | B2* | 4/2021 | Sugiyama | H04N 23/663 |
| 2007/0270184 | A1* | 11/2007 | Hurula | H04M 1/72409 |
| | | | | 455/557 |
| 2013/0028586 | A1* | 1/2013 | Ide | H04N 23/56 |
| | | | | 396/303 |
| 2018/0074833 | A1* | 3/2018 | Singaraju | G06F 13/102 |
| 2018/0348608 | A1* | 12/2018 | Kamiya | H04N 23/663 |
| 2020/0026154 | A1* | 1/2020 | Kawai | G03B 17/565 |

FOREIGN PATENT DOCUMENTS

JP 2019-129475 A 8/2019

* cited by examiner

*Primary Examiner* — Clayton E. LaBalle
*Assistant Examiner* — Diana Hancock
(74) *Attorney, Agent, or Firm* — Cowan, Liebowitz & Latman, P.C.

(57) ABSTRACT

An electronic apparatus which prevents occurrence of a malfunction even when multiple accessories are attached to the electronic apparatus directly or via an accessory connector. The electronic apparatus includes an attachment part to which an accessory connector is attachable or to which multiple accessories are attachable. On the accessory connector, multiple accessories are attachable. When multiple accessories have been attached to the attachment part or on the accessory connector attached to the attachment part, accessory information is obtained via the attachment part from each of the attached accessories. In a case where overlapping accessories with overlapping functions are found based on the accessory information, the overlapping function of at least one of the overlapping accessories is restricted.

16 Claims, 22 Drawing Sheets

FIG. 5

| | FIRST BYTE | SECOND BYTE | THIRD BYTE | ... | (N-2)-TH BYTE | (N-1)-TH BYTE | N-TH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 6

| Address | D7 | D6 | D5 | D4 | D3 | D2 | D1 | D0 |
|---|---|---|---|---|---|---|---|---|
| 0x00 | ACC TYPE ||||||||
| 0x01 | ACC IDENTIFICATION NUMBER ||||||||
| 0x02 | FIRMWARE VER. ||||||||
| 0x03 | ENERGIZATION WHEN POWER IS OFF | ENERGIZATION IN POWER-SAVING MODE ||| POWER FEEDING SPECIFICATIONS ||| SUPPORT FOR CHARGING |
| 0x04 | REQUESTED POWER ||||||||
| 0x05 | FIRMWARE UPDATE MODE | FIRMWARE UPDATE FUNCTION | PERMISSION FOR INTERMEDIATE CONNECTION ACCESSORY TO OPERATE | CHECK INTERMEDIATE CONNECTION ACCESSORY AT STARTUP ||| SUPPORT FOR I2C COMMAND COMMUNICATION ||
| 0x06 | RESERVED ||| METHOD FOR OBTAINING CAUSE TO REQUEST COMMUNICATION || FUNCTION SIGNAL4 | FUNCTION SIGNAL3 | FUNCTION SIGNAL2 | FUNCTION SIGNAL1 |
| 0x07 | RESERVED ||||||||
| 0x08 | RESERVED ||||||||
| 0x09 | RESERVED ||||||||
| 0x0A | SILENT START | CAUSE TO REQUEST COMMUNICATION |||||||
| 0x0B | RESERVED ||||||||
| 0x0C | RESERVED |||||| SPI PROTOCOL | CS LOGIC |
| 0x0D | COMMUNICATION INTERVAL BETWEEN SPI BYTES ||||||||
| 0x0E | COMMUNICATION INTERVAL BETWEEN SPI BYTES (IN FIRMWARE UPDATE MODE) ||||||||
| 0x0F | CHECKSUM ||||||||

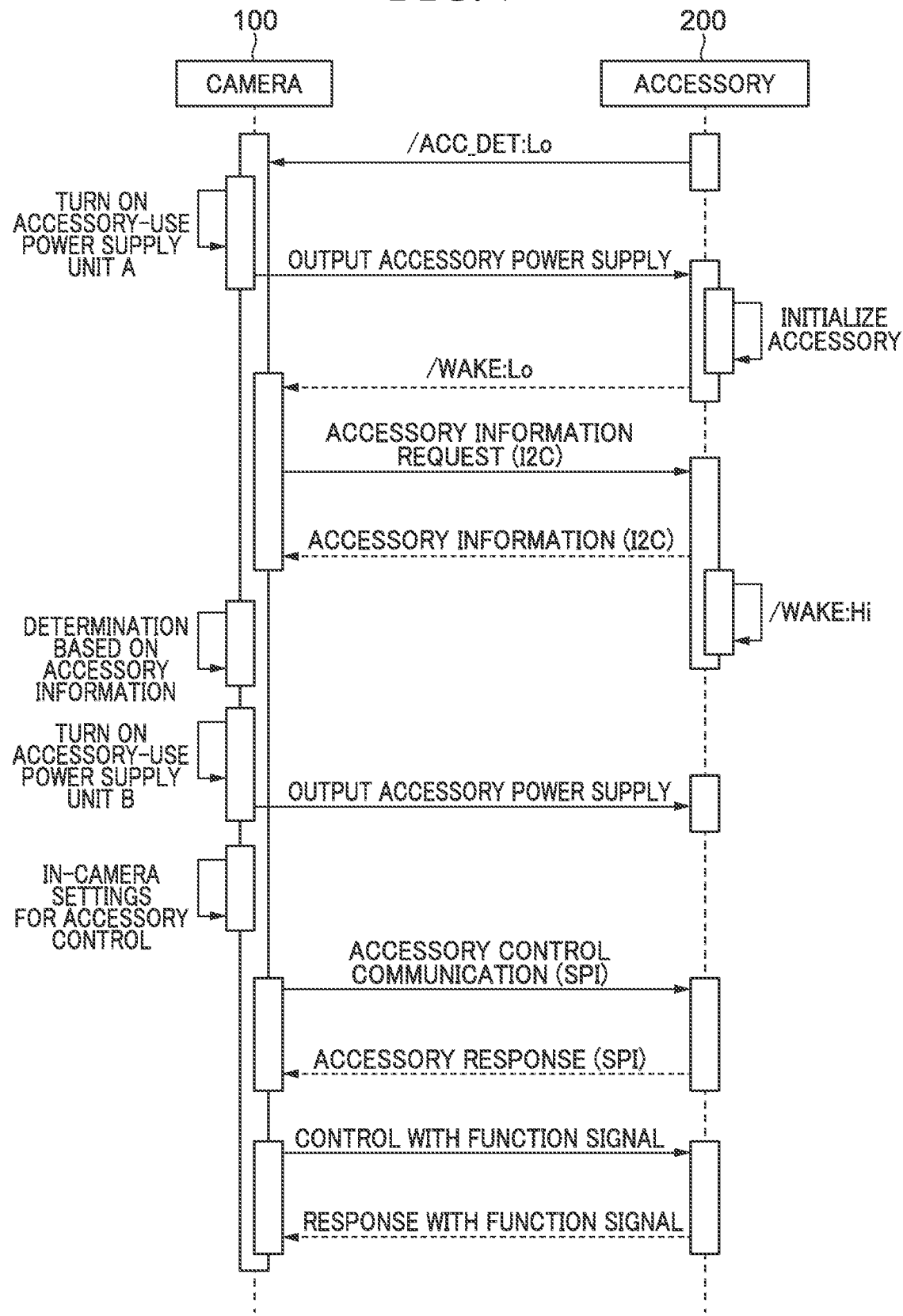

FIG. 8

| NUMBER | TYPE |
|---|---|
| 0x00 | RESERVED |
| 0x01 | RESERVED |
| : | : |
| 0x80 | RESERVED |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVED |
| 0x86 | RESERVED |
| 0x87 | RESERVED |
| 0x88 | RESERVED |
| 0x89 | RESERVED |
| 0x90 | RESERVED |
| : | : |
| 0xFF | RESERVED |

FIG. 9

| CAUSE NUMBER | CAUSE DETAIL |
|---|---|
| 0x00 | MENU CALL SW DEPRESSED |
| 0x01 | AUDIO STABILIZATION COMPLETED |
| 0x02 | AUDIO MUTE CANCELED |
| 0x03 | |
| 0x04 | |
| 0x05 | |
| 0x06 | |
| 0x07 | |
| ⋮ | |
| 0x79 | |
| 0x7A | |
| 0x7B | |
| 0x7C | |
| 0x7D | |
| 0x7E | |
| 0x7F | |

FIG. 10A

|   | COMMUNICATION INTERVAL |
|---|---|
| 0 | 1μs |
| 1 | 2μs |
| 2 | 5μs |
| 3 | 10μs |
| 4 | 15μs |
| 5 | 25μs |
| 6 | 50μs |
| 7 | 100μs |

FIG. 10B

|   | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

ELECTRONIC APPARATUS TO WHICH ACCESSORY IS ATTACHABLE, AND ACCESSORY

BACKGROUND OF THE INVENTION

Field of the Invention

The present invention relates to electronic apparatuses to which an accessory is attachable, and accessories.

Description of the Related Art

Conventionally, image pickup systems are known in which an accessory equipped with communication functions is mounted onto an image pickup apparatus served as an electronic apparatus, and the electronic apparatus and the accessory operate in response to each other by communicating with each other. Japanese Laid-Open Patent Publication (Kokai) No. 2019-129475 discloses a technique according to which, when a plurality of accessories is mounted on an image pickup apparatus on which a plurality of accessories is mountable, the time required to start the image pickup apparatus is reduced by performing authentication on the plurality of accessories simultaneously.

However, not all of the plurality of accessories mounted on the image pickup apparatus become available properly at the same time. For example, when two or more accessories having functions overlapping each other (overlapping functions) may not operate properly if they are used at the same time.

SUMMARY OF THE INVENTION

The present invention provides electronic apparatuses and accessories, which prevent occurrence of a malfunction even in a state where a plurality of accessories is mounted on an electronic apparatus directly or via an accessory connector.

According to an aspect of the invention, an electronic apparatus includes an attachment part to which an accessory is attachable and to which an accessory connector is attachable, where a plurality of accessories is attachable to the accessory connector. The electronic apparatus further includes a controller configured to: when a plurality of accessories has been attached to the accessory connector attached to the attachment part, obtain via the attachment part, accessory information of each of the plurality of accessories attached to the accessory connector; and in a case where overlapping accessories that have functions overlapping each other are found among the plurality of accessories based on the accessory information, restrict a function of at least one of the overlapping accessories, overlapping a function of another of the overlapping accessories.

According to another aspect of the invention, an electronic apparatus includes an attachment part to which a plurality of accessories is attachable, and a controller. The controller is configured to: obtain via the attachment part, accessory information of an accessory attached to the attachment part; and in a case where a plurality of accessories has been attached to the attachment part and overlapping accessories that have functions overlapping each other are found among the plurality of accessories based on the accessory information, restrict a function of at least one of the overlapping accessories, overlapping a function of another of the overlapping accessories.

According to another aspect of the invention, an accessory capable of being attached to an electronic apparatus, includes an accessory main body that executes a function of the accessory, and a plurality of contacts for a communication between the accessory and an electric apparatus to which the accessory has been attached. The accessory further includes an accessory controller configured to output information indicating one of the plurality of contacts, to be used in execution of the function of the accessory, via another of the plurality of contacts, being different from a contact indicated by the information.

According to the present invention, even in a state where a plurality of accessories is attached to an electronic apparatus directly or via an accessory connector, at least one of accessories with overlapping functions is controlled by the electronic apparatus to prevent occurrence of a malfunction coming from the overlap.

Further features of the present invention will become apparent from the following description of exemplary embodiments with reference to the attached drawings.

BRIEF DESCRIPTION OF THE DRAWINGS

FIG. 5 is a view illustrating details of communication carried out when a camera notifies an accessory of an operation execution command through SPI communication.

FIG. 6 is a view illustrating an example of accessory information.

FIG. 7 is a view illustrating a sequence that is performed when an accessory has been mounted on a camera.

FIG. 8 is a view illustrating an example of accessory type information.

FIG. 9 is a view illustrating examples of a cause for a communication request signal/WAKE.

FIGS. 10A and 10B are views illustrating the relationship between communication bytes and communication intervals with respect to data at addresses 0x0D and 0x0E.

DESCRIPTION OF THE EMBODIMENTS

An embodiment of the present invention will now be described with reference to the drawings.

Figure 1:
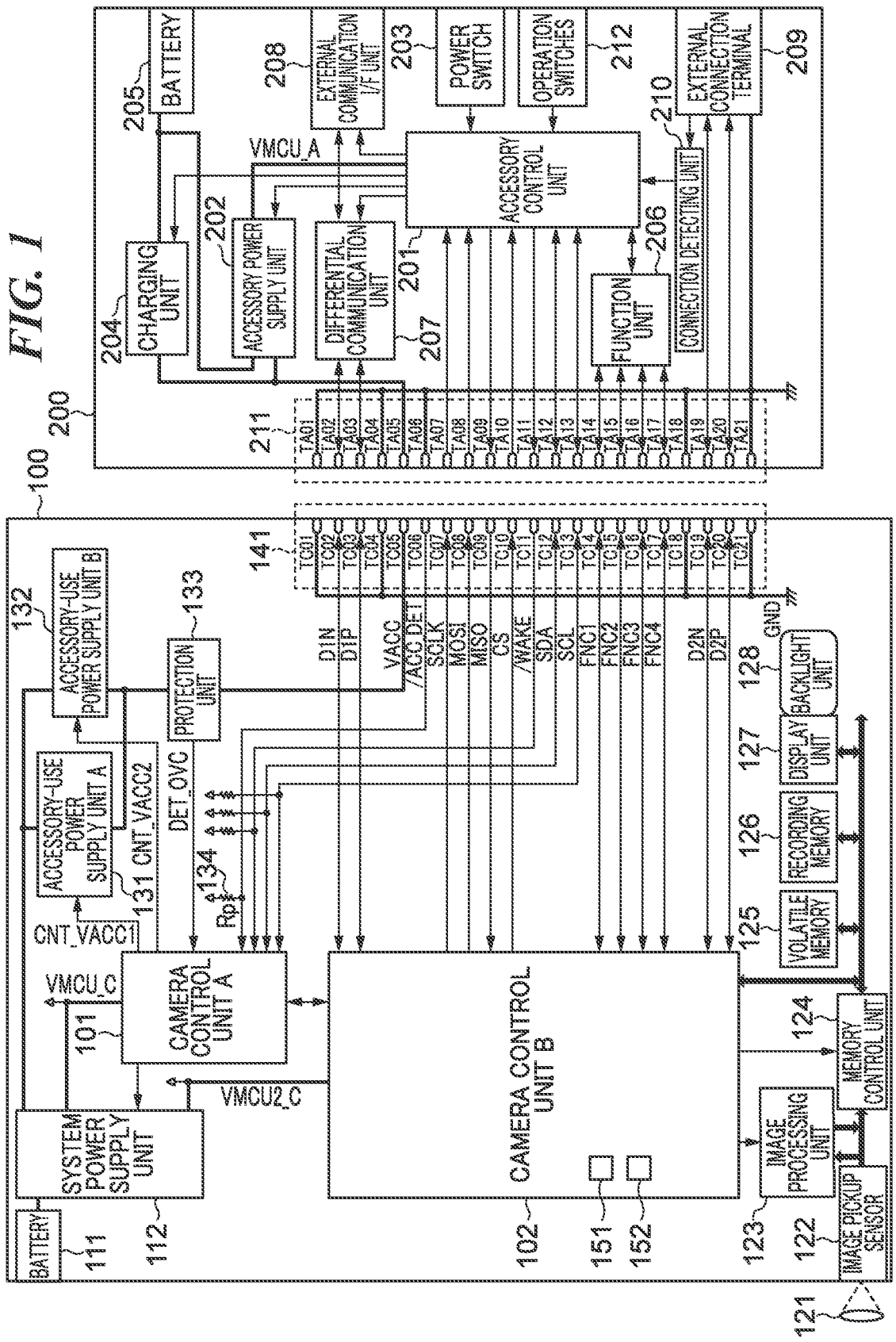
FIG. 1 is a block diagram of an image pickup system.

FIG. 1 is a block diagram of an image pickup system including an image pickup apparatus served as an electronic apparatus according to the present embodiment. This image pickup system includes a camera 100 served as the image pickup apparatus, and an accessory 200. The accessory 200 is removably mountable on (attachable to) the camera 100. FIG. 1 illustrates electric arrangements of the camera 100 and the accessory 200.

The camera 100 is equipped with a camera-side connection unit 141 that is a mount on which the accessory 200 is mountable (an attachment part to which the accessory 200 is attachable). The camera-side connection unit 141 includes contacts TC01 to TC21 that are a plurality of terminals. The accessory 200 is equipped with an accessory-side connection unit 211. The accessory-side connection unit 211 includes contacts TA01 to TA21 that are a plurality of terminals. The camera 100 and the accessory 200 are electrically connected together by the contacts TC01 to TC21 and the contacts TA01 to TA21 coming into contact with each other in a one-to-one relationship. It should be noted that the accessory 200 may not be equipped the plurality of contacts TA01 to TA21 in part.

The camera 100 is supplied with power from a battery 111. The battery 111 is removably attachable to the camera 100. A camera control unit A 101 and a camera control unit B 102 are each comprised of a microcomputer including a built-in CPU, and control the entire camera 100. The camera control unit A 101 monitors operation of, for example, a switch (which is not illustrated) for operating the camera 100. The camera control unit A 101 operates even when the camera 100 is in a standby state (a low power consumption mode), and controls, for example, a system power supply in response to user's operations. The camera control unit B 102 is responsible for controlling an image pickup sensor 122, a display unit 127, and so forth and is inactive in the standby state. It should be noted that although in the present embodiment, it is assumed that the camera control unit A 101 and the camera control unit B 102 are comprised of individual processors, they may be implemented by a single processor.

A system power supply unit 112 includes a DC-DC converter, an LDO (Low Dropout), a charge pump circuit, and so forth and generates power that is supplied to the components of the camera 100. From the battery 111, a voltage of 1.8 V generated by the system power supply unit 112 is applied as camera microcomputer power supply VMCU_C to the camera control unit A 101. Multiple kinds of voltages generated by the system power supply unit 112 are applied as camera microcomputer power supply VMCU2_C also to the camera control unit B 102 at any timing. The camera control unit A 101 controls the system power supply unit 112 to control turning-on/off of the power to the components of the camera 100.

The image pickup sensor 122 is comprised of a CMOS sensor, a CCD sensor, or the like. An optical lens 121 is removably attachable to the camera 100. Light from a subject enters the camera 100 through the attached optical lens 121 to form a subject image on the image pickup sensor 122. It should be noted that the optical lens 121 and the camera 100 may be configured as an integral unit. The subject image formed on the image pickup sensor 122 is coded into a digital image pickup signal. An image processing unit 123 generates image data by subjecting the digital image pickup signal to image processing such as noise reduction and white balancing. The image processing unit 123 also converts the generated image data into an image file in a JPEG format or the like so that it can be recorded in a recording memory 126. The image processing unit 123 also generates VRAM image data, which is to be displayed on the display unit 127, from the generated image data.

A memory control unit 124 controls sending and receiving of image data generated by the image processing unit 123 and other data. A volatile memory 125 is a memory, such as DDR3 SDRAM, capable of reading and writing data at high speed, and used as, for example, a work space for image processing performed by the image processing unit 123. The recording memory 126 is a readable and writable medium such as an SD card or a CFexpress card and removably attachable to the camera 100. The display unit 127 includes a display placed on a rear surface of the camera 100, and this display is comprised of an LCD panel, an organic electroluminescent display panel, or the like. A backlight unit 128 adjusts the brightness of the display unit 127 by changing the amount of backlight in the display unit 127.

An accessory-use power supply unit A 131 and an accessory-use power supply unit B 132 are voltage conversion units that convert a voltage supplied from the system power supply unit 112 to a predetermined voltage and generate accessory power supply VACC with a voltage of 3.3 V. It should be noted that the accessory-use power supply unit A 131 and the accessory-use power supply unit B 132 may be configured to convert the voltage to other voltages.

The accessory-use power supply unit A 131 is a power supply circuit with low self power consumption, which is comprised of an LDO or the like. The accessory-use power supply unit B 132 is comprised of a DC-DC converter or the like and capable of feeding larger electric current than the accessory-use power supply unit A 131. It should be noted that the self power consumption of the accessory-use power supply unit B 132 is greater than that of the self power consumption of the accessory-use power supply unit A 131. Thus, for small load current, the accessory-use power supply unit A 131 is more efficient than the accessory-use power supply unit B 132, and for large load current, the accessory-use power supply unit B 132 is more efficient than the accessory-use power supply unit A 131. The camera control unit A 101 controls turning-on/off of the accessory-use power supply unit A 131 and the accessory-use power supply unit B 132 according to the operating state of the accessory 200.

A protection unit 133 is comprised of a current fuse device, a polyswitch device, an electronic fuse unit which is a combination of a resistor, an amplifier, and a switch device, or the like. The protection unit 133 outputs an overcurrent detection signal DET_OVC when the value of a power supply current supplied from the accessory-use power supply unit A 131 or accessory-use power supply unit B 132 to the accessory 200 becomes greater than a predetermined value, i.e., it becomes excessive (abnormal). The protection unit 133 is, for example, an electronic fuse, and when a current of 1 A or higher is fed, the protection unit 133 notifies the camera control unit A 101 of it with the overcurrent detection signal DET_OVC. The overcurrent detection signal DET_OVC indicates an overcurrent when it is at the high level. It should be noted that the predetermined value may be different from 1 A.

The camera-side connection unit 141 is a connector that establishes electrical connection to the accessory 200 via the twenty-one contacts TC01 to TC21 arranged in a row. The contacts TC01 to TC21 are placed in this order from one end to the other end in the direction in which they are arranged. The contact TC01 is connected to the ground (GND) and acts not only as a contact at the reference potential but also as a contact that controls the wiring impedance for a differential signal D1N and a differential signal D1P. The contact TC01 corresponds to a third ground contact.

The differential signal D1N connected to the contact TC02 and the differential signal D1P connected to the contact TC03 are differential data communication signals that pair up with each other to carry out data communications and are connected to the camera control unit B 102. The contacts TC02 and TC03 and the contacts TC07 to TC17, TC19, and TC20, which will be described later, are communication contacts.

The contact TC04, which is a first ground contact, is connected to the GND and is a contact at the reference potential for the camera 100 and the accessory 200. The contact TC04 is placed outside of the contact TC05 in the direction in which the contacts are arranged. The accessory power supply VACC generated by the accessory-use power supply units A 131 and B 132 is connected to the contact TC05, which is a power supply contact, via the protection unit 133.

An accessory mounting detection signal/ACC_DET is connected to the TC06, which is a mounting detection contact. The accessory mounting detection signal/ ACC_DET is pulled up to the camera microcomputer power supply VMCU_C via a resistor Rp 134 (for example, 10 kΩ resistor). By reading a signal level of the accessory mounting detection signal/ACC_DET, the camera control unit A 101 is able to detect whether or not the accessory 200 has been mounted on the camera 100. When the signal level (potential) of the accessory mounting detection signal/ ACC_DET is the high level (predetermined potential), the accessory 200 is detected as unmounted, and when the signal level (potential) of the accessory mounting detection signal/ ACC_DET is the low level (the GND potential, which will be described later), the accessory 200 is detected as mounted.

When the signal level (potential) of the accessory mounting detection signal/ACC_DET becomes the high level from the low level while the power to the camera 100 is on, this triggers various communications between the camera 100 and the accessory 200 via the contacts.

In response to detecting the accessory 200 as mounted, the camera control unit A 101 supplies power to the accessory 200 via the contact TC05, which is the power supply contact.

SCLK (Serial Clock) is connected to the contact TC07. MOSI (Master Out Slave In) is connected to the contact TC08. MISO (Master In Slave Out) is connected to the contact TC09. CS (Slave Select) is connected to the contact TC10. SCLK, MOSI, MISO, and CS are signals for the camera control unit B 102 acting as a communication master to carry out SPI (Serial Peripheral Interface) communication. In the present embodiment, the clock frequency of 1 MHz, the data length of 8 bits (1 byte), the bit order of MSB first, and the full-duplex communication method are used in the SPI communication.

A communication request signal/WAKE for the accessory 200 to issue a communication request to the camera control unit A 101 is connected to the contact TC11. The communication request signal/WAKE is pulled up to the camera microcomputer power supply VMCU_C via a resistor. The camera control unit A 101 is capable of receiving the communication request from the accessory 200 by detecting a falling edge of the communication request signal/WAKE.

A signal SDA connected to the contact TC12 and a signal SCL connected to the contact TC13 are signals for the camera control unit A 101 acting as a communication master to carry out I2C (Inter-Integrated Circuit) communication. The signals SDA and SCL are of an open-drain output type and pulled up to the camera microcomputer power supply VMCU_C. It is assumed that in this communication, the communication frequency is 100 kbps. In I2C communication, both of data transmission from the camera 100 and data transmission from the accessory 200 are performed via SDA. Comparing SPI communication and I2C communication, the communication speed of I2C communication is lower than that of SPI communication. Since the communication speed of SPI communication is higher than that of I2C communication, SPI communication is suitable for communication of information comprising a large amount of data. For this reason, in communication between the camera 100 and the accessory 200 according to the present embodiment, SPI communication is used for communication of information comprising a large amount of data while I2C communication is used for communication of information comprising a small amount of data. For example, data is communicated using I2C communication first, and when it is possible to carry out SPI communication or necessary to carry out SPI communication based on the data, control is performed to carry out SPI communication as well.

Figure 17A:
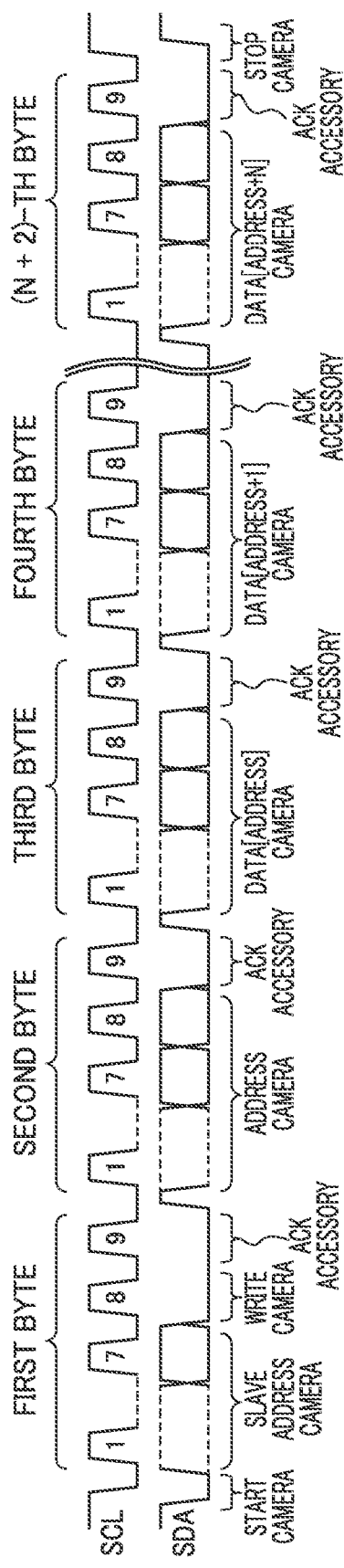
FIGS. 17A and 17B are views illustrating examples of I2C communication waveforms.
Figure 17B:
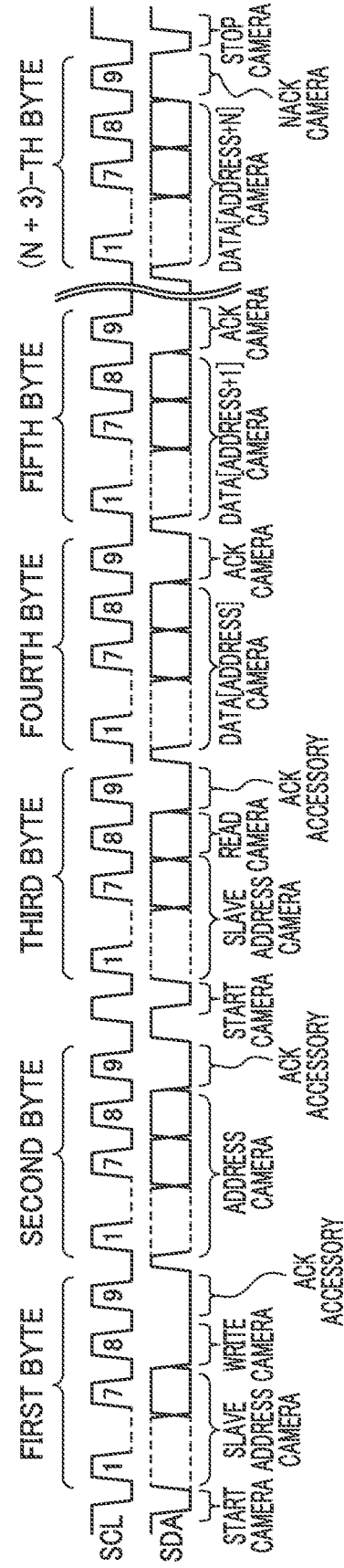

FIGS. 17A and 17B are views illustrating examples of I2C communication waveforms. FIG. 17A illustrates an example of waveforms in a case where the camera 100 sends data of N bytes (DATA[1] to DATA[N]) to the accessory 200. FIG. 17B illustrates an example of waveforms in a case where the camera 100 receives data of N bytes (DATA[1] to DATA[N]) from the accessory 200.

Referring to FIG. 17A, in communication of the first byte and the second byte, the camera control unit A 101 notifies an accessory control unit 201 of information about addresses at which data to be sent is stored. In communication of the third to the (N+2)-th bytes, the camera control unit A 101 sends data of N bytes (DATA[ADDRESS] to DATA[ADDRESS+N]) to the accessory control unit 201.

Referring to FIG. 17B, in communication of the first byte and the second byte, the camera control unit A 101 notifies the accessory control unit 201 of information about addresses at which data to be received is stored. In communication of the third to the (N+3)-th bytes, the camera control unit A 101 receives data of N bytes (DATA[ADDRESS] to DATA[ADDRESS+N]) from the accessory control unit 201.

A description will now be given of flowcharts in FIGS. 18 to 20.

Figure 18:
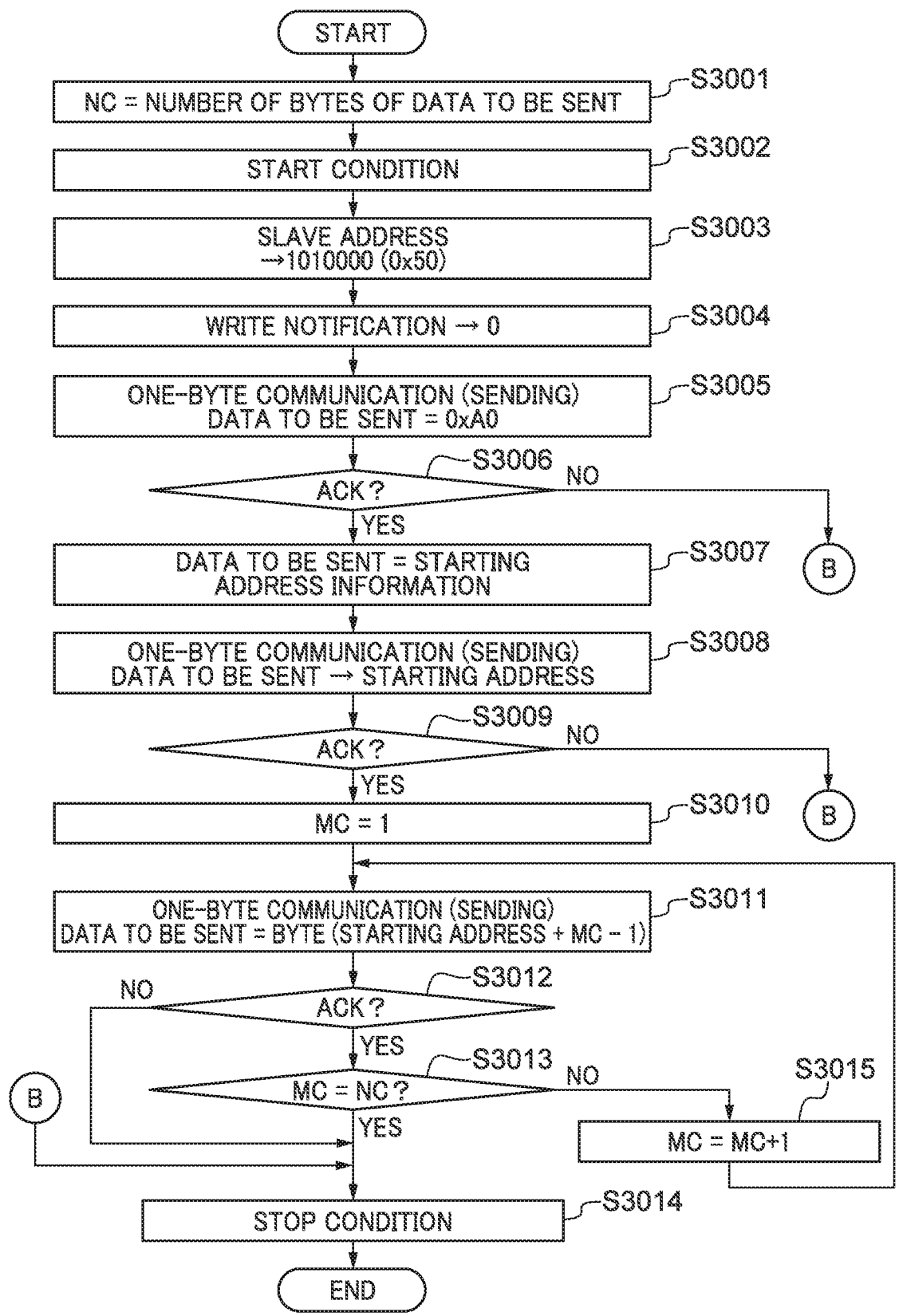
FIG. 18 is a flowchart illustrating a process that is carried out by a camera control unit A in a case where the camera control unit A sends data of N bytes to the accessory control unit.

FIG. 18 is a flowchart illustrating a process that is carried out by the camera control unit A 101 in a case where the camera control unit A 101 sends data of N bytes to the accessory control unit 201. This process is implemented by the CPU (which is not illustrated) in the camera control unit A 101 loading a program stored in a ROM (which is not illustrated) in the camera control unit A 101 to a RAM (which is not illustrated) in the camera control unit A 101 and executing the same.

In step S3001, the camera control unit A 101 stores a numeric value, which represents the number of bytes of data to be sent, in a variable NC. For example, when three bytes are to be sent, 3 is stored in the variable NC. In the present embodiment, it is assumed that 3 is stored in the variable NC.

In step S3002, the camera control unit A 101 changes SDA to the low level (START condition) while SCL is at the high level. This notifies the accessory control unit 201 that communication has been started.

In step S3003, the camera control unit A 101 sets slave address information, which indicates a slave address of the accessory control unit 201, in the upper seven bits of data to be sent. In the present embodiment, it is assumed that the slave address of the accessory control unit 201 is 1010000 in binary notation (0x50 in hexadecimal notation).

In step S3004, the camera control unit A 101 sets information (WRITE notification), which indicates that the communication is a WRITE communication, in the lowest one bit of the data to be sent. This bit being set to 0 means that the communication is the WRITE communication.

In step S3005, the camera control unit A 101 sends the data (10100000 in binary notation, 0xA0 in hexadecimal notation), which was set in the steps S3003 and S3004 as the data to be sent, to the accessory control unit 201.

In step S3006, after sending the data of one byte, the camera control unit A 101 outputs SCL for one clock and also checks the signal level of SDA. When the signal level of SDA is low, the camera control unit A 101 determines that it indicates an acknowledgment or data receipt notification (ACK) from the accessory control unit 201, followed by the process proceeding to step S3007. On the other hand, when the signal level of SDA is high, the camera control unit A 101 determines that the accessory control unit 201 has not properly received the data, followed by the process proceeding to step S3014.

In the step S3007, the camera control unit A 101 sets information about an address at which the data to be sent to the accessory control unit 201 is stored (starting address information) as the data to be sent. In the present embodiment, it is assumed that the size of the starting address information is one byte, and its value is 0x00.

In step S3008, the camera control unit A 101 sends the set starting address information of one byte (the value 0x00) to the accessory control unit 201. In step S3009, after sending the starting address information of one byte, the camera control unit A 101 outputs SCL for one clock and also checks the signal level of SDA. When the signal level of SDA is low, the camera control unit A 101 determines that it is an acknowledgment or data receipt notification (ACK) from the accessory control unit 201, followed by the process proceeding to step S3010. On the other hand, when the signal level of SDA is high, the camera control unit A 101 determines that the accessory control unit 201 has not properly received the data, followed by the process proceeding to the step S3014.

In step S3010, the camera control unit A 101 stores 1 in a variable MC. The variable MC is a variable for counting the number of bytes of sent data. In step S3011, the camera control section A 101 outputs SCL for one byte and change SDA to a desired signal level while SCL is low, thereby sending data of one byte (BYTE (starting address+MC−1)) to the accessory control unit 201. Here, since the starting address information of one byte is 0x00, and the variable MC is 1, the camera control unit A 101 sends data of one byte corresponding to an address 0x00.

In step S3012, after sending the data of one byte, the camera control unit A 101 outputs SCL for one clock and also checks the signal level of SDA. When the signal level of SDA is low, the camera control unit A 101 determines that it is an acknowledgment or data receipt notification (ACK) from the accessory control unit 201, followed by the process proceeding to step S3013. On the other hand, when the signal level of SDA is high, the camera control unit A 101 determines that the accessory control unit 201 has not properly received the data, followed by the process proceeding to the step S3014.

In the step S3013, the camera control unit A 101 determines whether or not the variable MC is the same value as the variable NC. When the variable MC is the same value as the variable NC, the camera control unit A 101 determines that sending of all data has been completed, followed by the process proceeding to the step S3014. When the variable MC is not the same value as the variable NC, the camera control unit A 101 determines that there is still remaining data to be sent, followed by the process proceeding to step S3015.

In the step S3015, the camera control unit A 101 adds 1 to the variable MC, followed by the process returning to the step S3011. After the process returns to the step S3011, the camera control unit A 101 successively increments the address of data to be sent and sends one-byte data corresponding to the address.

By thus repeatedly sending one-byte data in this manner until the variable MC and the variable NC become equal in the process in the step S3013, the camera control unit A 101 sends data of N bytes to the accessory control unit 201. When the variable NC is 3 as with the present embodiment, the camera control unit A 101 sends data of three bytes.

In the step S3014, the camera control unit A 101 changes SDA to the high level (STOP condition) while SCL is at the high level. This notifies the accessory control unit 201 that the communication has ended.

Figure 19:
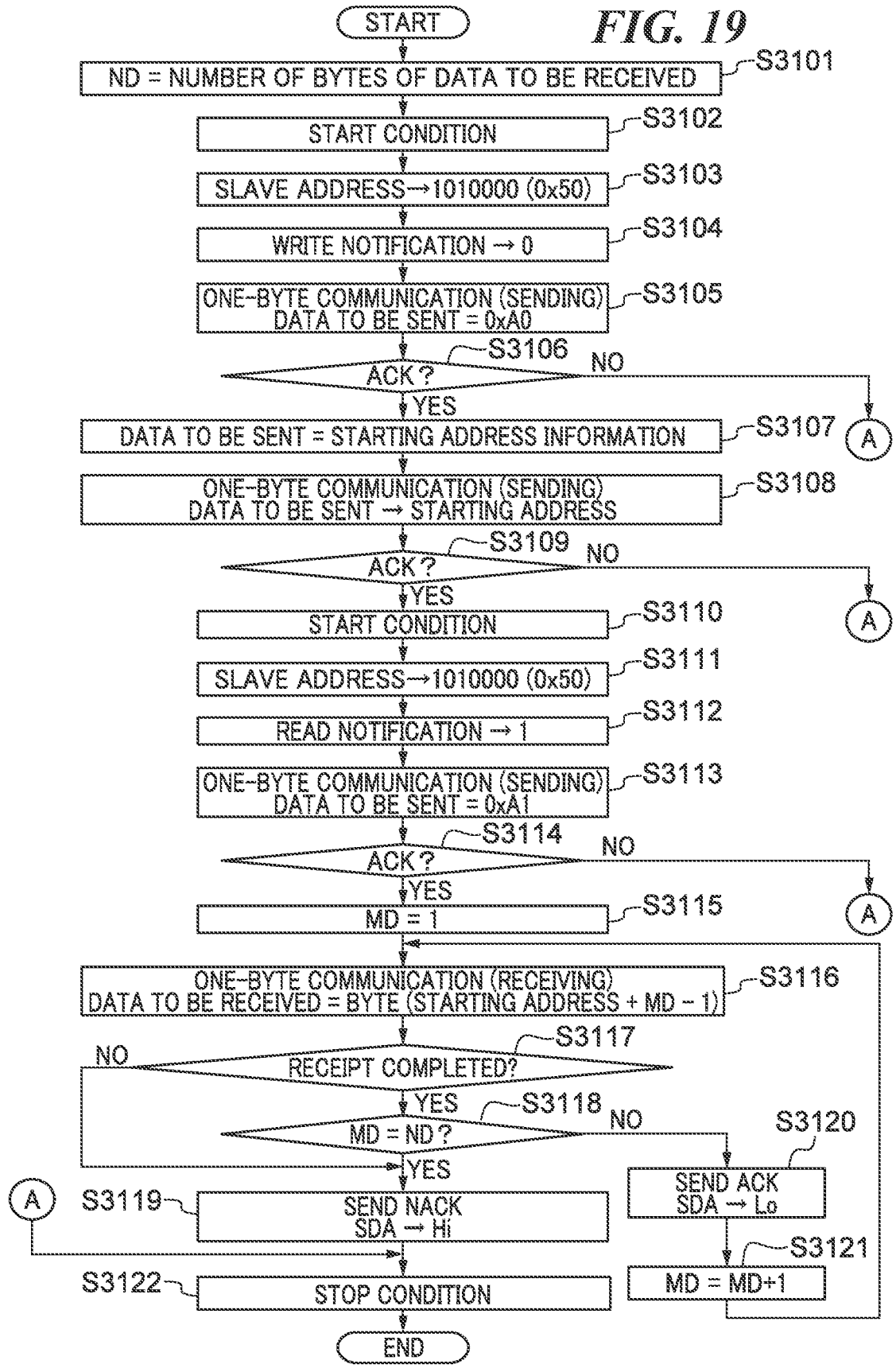
FIG. 19 is a flowchart illustrating a process that is carried out by the camera control unit A in a case where the camera control unit A receives data of N bytes from the accessory control unit.

FIG. 19 is a flowchart illustrating a process that is carried out by the camera control unit A 101 in the case where the camera control unit A 101 receives data of N bytes from the accessory control unit 201. This process is implemented by the CPU (which is not illustrated) in the camera control unit A 101 loading a program stored in the ROM (which is not illustrated) in the camera control unit A 101 to the RAM (which is not illustrated) in the camera control unit A 101 and executing the same.

In step S3101, the camera control unit A 101 stores a numeric value, which represents the number of bytes of data to be received, in a variable ND. For example, when three bytes are to be received, 3 is stored in the variable ND. In the present embodiment, it is assumed that 3 is stored in the variable ND. In steps S3102 to S3106, the camera control unit A 101 carries out the same processes in the respective steps S3002 to S3006.

In step S3107, the camera control unit A 101 sets information about an address at which the data to be received from the accessory control unit 201 is stored (starting address information) as data to be sent. In the present embodiment, it is assumed that the size of the starting address information is one byte, and its value is 0x00. In step S3108, the camera control unit A 101 sends the set starting address information of one byte (the value 0x00) to the accessory control unit 201.

In step S3109, after sending the starting address information of one byte, the camera control unit A 101 outputs SCL for one clock and also checks the signal level of SDA. When the signal level of SDA is low, the camera control unit A 101 determines that it is an acknowledgment or data receipt notification (ACK) from the accessory control unit 201, followed by the process proceeding to step S3110. On the other hand, when the signal level of SDA is high, the camera control unit A 101 determines that the accessory control unit 201 has not properly received the data, followed by the process proceeding to step S3122.

In the step S3110, the camera control unit A 101 notifies the accessory control unit 201 of the START condition by changing SDA to the low level while SCL is at the high level, similarly to step S3102. In step S3111, the camera control unit A 101 sets slave address information, which indicates the slave address of the accessory control unit 201, in the upper seven bits of the data to be sent. In the present embodiment, it is assumed that the slave address of the accessory control unit 201 is 1010000 in binary notation (0x50 in hexadecimal notation).

In step S3112, the camera control unit A 101 sets information, which indicates that the communication is a READ communication, in the lowest one bit of the data to be sent. This bit being set to 1 means that the communication is the READ communication.

In step S3113, the camera control unit A 101 sends the data (10100001 in binary notation, 0xA0 in hexadecimal notation), which was set in the steps S3103 and S3104 as the data to be sent, to the accessory control unit 201.

In step S3114, after sending the data of one byte, the camera control unit A 101 outputs SCL for one clock and also checks the signal level of SDA. When the signal level of SDA is low, the camera control unit A 101 determines that it indicates an acknowledgment or data receipt notification (ACK) from the accessory control unit 201, followed by the process proceeding to step S3115. On the other hand, when the signal level of SDA is high, the camera control unit A 101 determines that the accessory control unit 201 has not properly received the data, followed by the process proceeding to step S3122.

In the step S3115, the camera control unit A 101 stores 1 in a variable MD. The variable MD is a variable for counting the number of bytes of received data. In step S3116, the camera control unit A 101 outputs SCL for one byte and reads the signal level of SDA at a point of time when SCL changes from the low level to the high level. This enables the camera control unit A 101 to receive data of one byte (BYTE (starting address+MD−1)) from the accessory control unit 201. The received one-byte data, which is data corresponding to the address 0x00, can be stored in the volatile memory 125 or used for predetermined process.

In step S3117, the camera control unit A 101 determines whether or not the data of one byte has been properly received. When the camera control unit A 101 determines that the data of one byte has been properly received, the process proceeds to step S3118, and when the camera control unit A 101 determines that the data of one byte has not properly received, the process proceeds to step S3119.

In the step S3118, the camera control unit A 101 determines whether or not the variable MD is the same value as the variable ND. When the variable MD is the same value as the variable ND, the camera control unit A 101 determines that receipt of all data has been completed, followed by the process proceeding to the step S3119. When the variable MD is not the same value as the variable ND, the camera control unit A 101 determines that there is still remaining data to be received, followed by the process proceeding to step S3120.

In the step S3120, by outputting SCL of one byte and also controlling SDA to the low level (Lo), the camera control unit A 101 provides an acknowledgment or data receipt notification (ACK) to the accessory control unit 201 and informs the accessory control unit 201 that data communication will be continued. In the step S3121, the camera control unit A 101 adds 1 to the variable MD, followed by the process returning to the step S3116. After the process returns to the step S3116, the camera control unit A 101 successively increments the address of data to be received and receives one-byte data corresponding to the address.

By thus repeatedly receiving one-byte data in this manner until the variable MD and the variable ND become equal in the process in the step S3118, the camera control unit A 101 receives data of N bytes from the accessory control unit 201. When the variable ND is 3 as with the present embodiment, the camera control unit A 101 receives data of three bytes.

In the step S3119, by outputting SCL of one byte and also controlling SDA to the high level (Hi), the camera control unit A 101 informs the accessory control unit 201 that the data communication has been completed (NACK). In the step S3122, the camera control unit A 101 changes SDA to the high level (STOP condition) while SCL is at the high level. This notifies the accessory control unit 201 that the communication has ended.

Figure 20:
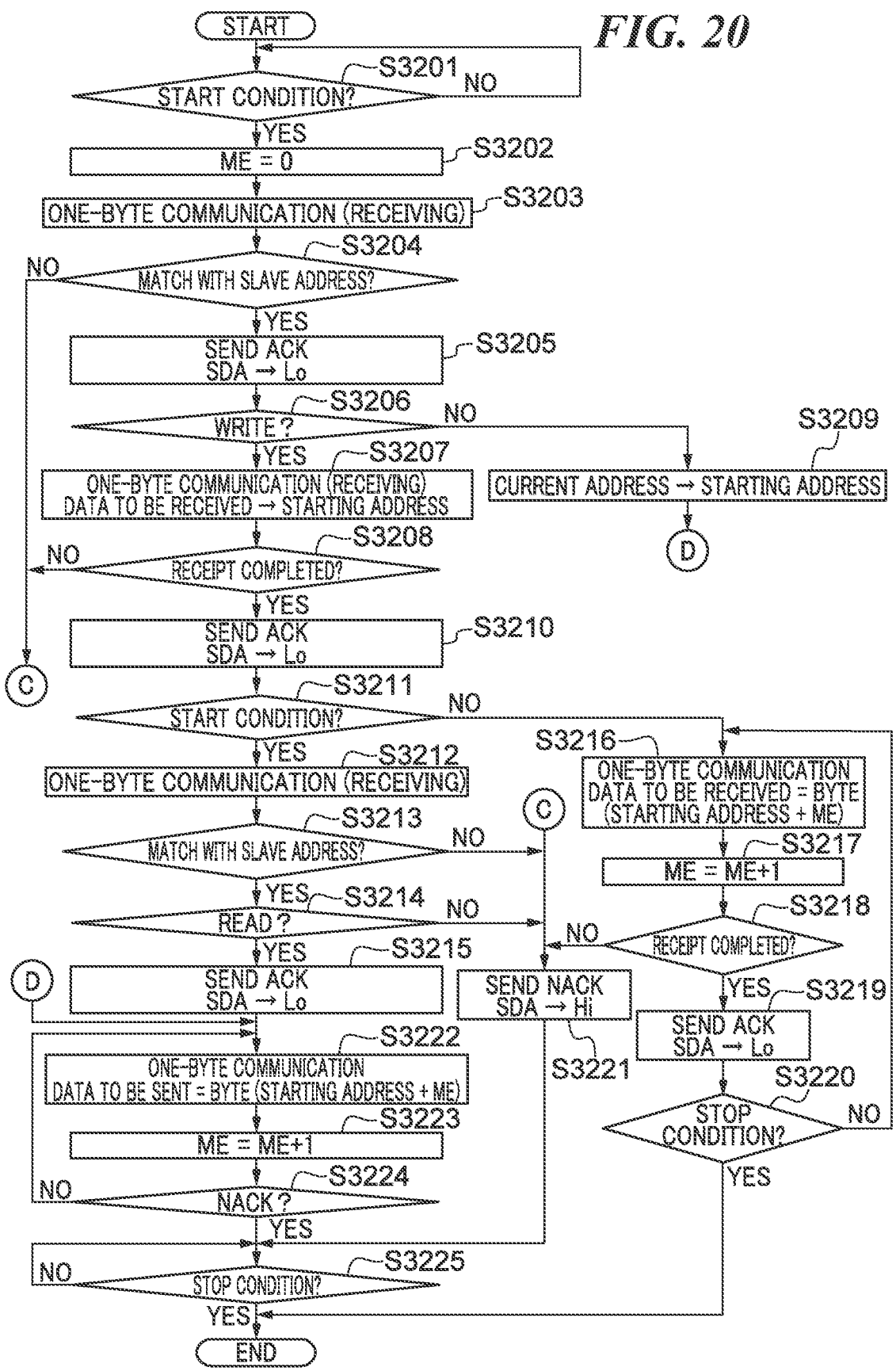
FIG. 20 is a flowchart illustrating a process that is carried out by the accessory control unit in a case where the camera control unit A and the accessory control unit send and receive data of N bytes to and from each other.

FIG. 20 is a flowchart of a process that is carried out by the accessory control unit 201 in a case where the accessory control unit 201 and the camera control unit A 101 send and receive data of N bytes to and from each other. This process includes a process in which the accessory control unit 201 receives the data of N bytes from the camera control unit A 101 and a process in which the accessory control unit 201 sends the data of N bytes to the camera control unit A 101.

This process is implemented by the CPU (which is not illustrated) in the accessory control unit 201 loading a program stored in a ROM (which is not illustrated) in the accessory control unit 201 to a RAM (which is not illustrated) in the accessory control unit 201 and executing the same.

In step S3201, the accessory control unit 201 stands by until SDA changes to the low level (enters into the START condition) while SCL is at the high level. When the accessory control unit 201 detects the START condition, the process proceeds to step S3202.

In the step S3202, the accessory control unit 201 stores 0 in a variable ME. The variable ME is a variable for counting the number of bytes of sent and received data. In step S3203, the accessory control unit 201 receives data of one byte sent from the camera control unit A 101.

In step S3204, the accessory control unit 201 determines whether or not data in the upper seven bits of the one-byte data received in the step S3203 matches the slave address (0x50 in the present embodiment) of the accessory control unit 201. When the accessory control unit 201 determines that the data in the upper seven bits matches the slave address of the accessory control unit 201, the process proceeds to step S3205. When the accessory control unit 201 determines that the data in the upper seven bits does not match the slave address of the accessory control unit 201, the process proceeds to step S3221.

In the step S3205, by controlling SDA to the low level (Lo) in response to SCL for one clock output by the camera control unit A 101 following the receipt of the one-byte data, the accessory control unit 201 provides an acknowledgment or data receipt notification (ACK) to the camera control unit A 101. In step S3206, based on data in the lowest one bit of the one-byte data received in the step S3203, the accessory control unit 201 determines a type of data in a one-byte communication to be performed next. When the data in the lowest one bit is 0 (WRITE), the accessory control unit 201 determines that the data in the one-byte communication to be performed next is starting address information to be provided from the camera control unit A 101 to the accessory control unit 201, followed by the process proceeding to step S3207. When the data in the lowest one bit is 1, the accessory control unit 201 determines that the data in the one-byte communication to be performed next is data to be sent from the accessory control unit 201 to the camera control unit A 101, followed by the process proceeding to step S3209.

In the step S3207, the accessory control unit 201 receives data of one byte sent from the camera control unit A 101. The received data of one byte is information (starting address information) indicating an address at which data to be sent/received in the subsequent communication is stored. As described earlier with reference to FIGS. 18 and 19, it is assumed that the starting address information is 0x00.

In the step S3209, the accessory control unit 201 sets address information stored beforehand in the accessory control unit 201 or address information of which it was notified beforehand by the camera control unit A 101 as the starting address information.

In step S3208, when the accessory control unit 201 determines that it has properly received the one-byte data, the process proceeds to step S3210, and when the accessory control unit 201 determines that it has not properly received the one-byte data, the process proceeds to the step S3221. In step S3210, by controlling SDA to the low level (Lo) in response to SCL clock output by the camera control unit A 101 following the receipt of the one-byte data, the accessory control unit 201 provides an acknowledgment or data receipt notification (ACK) to the camera control unit A 101.

In step S3211, the accessory control unit 201 determines whether or not SDA changed to the low level (entered into the START condition) while SCL was at the high level. When the accessory control unit 201 has detected the START condition, it determines that data of one byte to be communicated next is data to be sent from the camera control unit A 101 to the accessory control unit 201. Namely, the accessory control unit 201 determines that data of one byte to be communicated next is data indicating the slave address and the communication type, followed by the process proceeding to step S3212. When the accessory control unit 201 has not detected the START condition, it determines that data of one byte to be communicated next is data to be received by the accessory control unit 201 from the camera control unit A 101, followed by the process proceeding to step S3216.

In the step S3212, the accessory control unit 201 receives the data of one byte sent from the camera control unit A 101. In step S3213, the accessory control unit 201 determines whether or not data in the upper seven bits of the one-byte data received in the step S3212 matches the slave address (0x50 in the present embodiment) of the accessory control unit 201. When the accessory control unit 201 determines that the data in the upper seven bits matches the slave address of the accessory control unit 201, the process proceeds to step S3214. When the accessory control unit 201 determines that the data in the upper seven bits does not match the slave address of the accessory control unit 201, the process proceeds to the step S3221.

In the step S3214, based on data in the lowest one bit of the one-byte data received in the step S3203, the accessory control unit 201 determines a type of data in a one-byte communication to be performed next. When the accessory control unit 201 determines that the data in the lowest one bit is 0, the process proceeds to the step S3221. When the data in the lowest one bit is 1 (READ), the accessory control unit 201 determines that the data in the one-byte communication to be performed next is data to be sent from the accessory control unit 201 to the camera control unit A 101, followed by the process proceeding to step S3215.

In the step S3215, by controlling SDA to the low level (Lo) in response to SCL for one clock output by the camera control unit A 101 following the receipt of the one-byte data, the accessory control unit 201 provides an acknowledgment or data receipt notification (ACK) to the camera control unit A 101. In step S3222, the accessory control unit 201 sends data of one byte (BYTE (Starting address+ME)) based on the starting address information received from the camera control unit A 101 or in the step S3207 or the starting address information set in the step S3209 to the camera control unit A 101.

In step S3223, the accessory control unit 201 adds 1 to the variable ME, followed by the process returning to step S3224. In the step S3224, after sending data of one byte, the accessory control unit 201 checks the signal level of SDA. When the signal level of SDA is the high level, the camera control unit A 101 determines that it indicates a notification (NACK) that the camera control unit A 101 has completed receipt of all data, followed by the process proceeding to step S3225. On the other hand, when the signal level of SDA is the low level, the accessory control unit 201 determines that the camera control unit A 101 is continuing to request data transmission from the accessory control unit 201, followed by the process returning to the step S3222.

After the process thus returns to the step S3222, the camera control unit A 101 successively increments the addresses of data to be sent and sends one-byte data corresponding to the address. By repeatedly sending one-byte data until NACK is sent from the camera control unit A 101 in the process in the step S3224, the accessory control unit 201 sends data of N bytes to the camera control unit A 101.

In step S3225, the accessory control unit 201 stands by until SDA changes to the high level (enters into the STOP condition) while SCL is at the high level. Upon detecting the STOP condition, the accessory control unit 201 ends the communication.

In step S3216, the accessory control unit 201 receives data of one byte (BYTE (Starting address+ME)). The one-byte data, which is data corresponding to the starting address information received from the camera control unit A 101 in step S3207, is stored in a nonvolatile memory, which is not illustrated, or used for a predetermined process.

In step S3217, the accessory control unit 201 adds 1 to the variable ME, followed by the process returning to step S3218. In the step S3218, the accessory control unit 201 determines whether or not the data of one byte has been properly received. When the accessory control unit 201 determines that the data of one byte has been properly received, the process proceeds to step S3219, and when the camera control unit A 101 determines that the data of one byte has not been properly received, the process proceeds to the step S3221.

In the step S3219, by controlling SDA to the low level (Lo) in response to SCL for one clock output by the camera control unit A 101 following the receipt of the one-byte data, the accessory control unit 201 provides an acknowledgment or data receipt notification (ACK) to the camera control unit A 101. In step S3220, the accessory control unit 201 determines whether or not SDA changed to the high level (entered into the STOP condition) while SCL was at the high level. Upon detecting the STOP condition, the accessory control unit 201 ends the communication. On the other hand, when the accessory control unit 201 has not detected the STOP condition, it determines that data will be continuously sent from the camera control unit A101 to the accessory control unit 201, followed by the process returning to the step S3216.

After the process thus returns to the step S3216, the accessory control unit 201 successively increments the addresses of data to be received and receives one-byte data corresponding to the address. By repeatedly receiving one-byte data until the notification of the STOP condition is provided in the step S3220, the accessory control unit 201 receives data of N bytes from the camera control unit A 101.

Referring to FIG. 1 again, an FNC1 signal connected to the contact TC14, an FNC2 signal connected to the contact TC15, an FNC3 signal connected to the contact TC16, and an FNC4 signal connected to the contact TC17 are function signals handling functions that vary according to the type of the mounted accessory 200. For example, when the accessory 200 is a microphone device, a signal communicated via the contact TC15 is an audio data signal. When the accessory 200 is an illumination device (strobe unit), a signal communicated via the contact TC14 is a signal that provides notification of strobe firing timing (strobe firing timing signal).

It should be noted that the contacts may be configured such that, depending on the type of the mounted accessory (accessory type), signals that implement different functions may be communicated via the same contact. For example, in a case where the accessory 200 is an accessory other than an illumination device, a synchronization signal for controlling the timing different from the strobe firing timing may be communicated via the contact TC14. The contacts TC14 to TC17 correspond to function signal contacts. Communication using at least one of the function signal contacts is referred to as function signal communication as well. Concurrently with I2C communication or SPI communication, the function signal communication may be performed with timing independent on I2C communication or SPI communication.

The accessory types here mean microphones, illumination devices, and so forth described above. Accessories that implement functions to serve the same purpose, such as illumination devices with different performances, are accessories of the same type. Accessories that implement functions to serve the different purposes, such as a microphone and an illumination device, are accessories of different types. The function signal communication is performed based on information obtained by I2C communication or SPI communication.

The contact TC18, which is a second ground contact, is also connected to the GND, and as with the contact TC04, the contact TC18 is a contact at the reference potential for the camera 100 and the accessory 200. A differential signal D2N connected to the contact TC19 and a differential signal D2P connected to the contact TC20 are data communication signals that pair up with each other to carry out data communications and are connected to the camera control unit B 102. For example, USB communication can be performed via the contacts TC19 and TC20.

The contact TC21, which is connected to the GND, acts not only as a contact at the reference potential but also as a contact that controls the wiring impedance for the differential signal D2N and the differential signal D2P. The contact TC21 corresponds to a fourth ground contact. The contacts TC01, TC04, TC06, TC18, and TC21 are connected to, for example, a GND area of a flexible board, and the GND area of the flexible board is fixed to a metallic member, which is at the GND level of the camera 100, by screws or the like. Examples of the metallic member which is at the GND level include an engaging member that engages with the accessory 200 via an accessory shoe and a base plate, which is not illustrated, inside the camera 100.

In the present embodiment, the mounting detection contact TC06 to which the accessory mounting detection signal/ACC_DET is connected is placed next to the contact (first clock contact) TC07 that transmits SCLK (first clock signal) that is a clock signal. In general, noise associated with a change in the potential of a clock signal (clock noise) is transmitted to a contact placed next to a contact for the clock signal, and this may cause a malfunction. This effect increases particularly in an arrangement in which there are a number of contacts, and the distances between the contacts is short. Accordingly, by placing the mounting detection contact TC06 next to the SCLK contact TC07, the effects of the clock noise can be reduced.

Before an accessory is mounted on the camera 100, the accessory mounting detection signal/ACC_DET is pulled up to the predetermined power supply, whereas after the accessory is mounted on the camera 100, the accessory mounting detection signal/ACC_DET is set at the GND potential. On the other hand, the SCLK contact TC07 that transmits the clock signal does not transmit the clock signal before an accessory is mounted on the camera 100, and hence its potential does not change. After the accessory is mounted on the camera 100, the SCLK contact TC07 transmits the clock signal, causing the potential to change.

When the SCLK contact TC07 transmits the clock signal, the mounting detection contact TC06 is at the GND potential. For this reason, even when the mounting detection contact TC06 is exposed to the clock noise, the potential in the control units of the camera 100 and the accessory 200 are unlikely to change, and hence a malfunction can be prevented. Moreover, the clock noise can be prevented from being further transmitted to a location apart from the mounting detection contact TC06. As a result, there is no need to place a GND terminal, and hence the effects of the clock noise can be reduced without increasing the number of contacts.

SCL (second clock signal) that is a clock signal is transmitted to the contact TC13 (second clock contact) as well. SCLK transmitted to the SCLK contact TC07 has a higher frequency than that of SCL, and a larger amount of clock noise is generated from the SCLK contact TC07 than from the SCL contact TC13. For this reason, the effect of preventing a multifunction caused by clock noise is greater in the case where the mounting detection contact TC06 is placed next to the SCLK contact TC07 than in the case where the mounting detection contact TC06 is placed next to the SCL contact TC13.

As well as the difference in frequency, SCL and SCLK differ in the following point. SCL transmitted through the SCL contact TC13 is a clock signal conforming to the I2C communication standard, and voltage variations in signal line voltage are caused by open-drain connection. On the other hand, SCLK transmitted through the SCLK contact TC07 is a clock signal conforming to the SPI communication standard, and variations in signal line voltage are caused by CMOS output. For this reason, the edges of variations in voltage at the SCL contact TC13 are gentler than those at the SCLK contact TC07, and hence clock noise is less likely to be generated from the SCL contact TC13. Therefore, placing the mounting detection contact TC06 next to the SCLK contact TC07 achieves a higher effect of preventing a malfunction caused by clock noise than placing the mounting detection contact TC06 next to the SCL contact TC13.

There may be a case where clock signals are transmitted by transmitting the differential signals D1N and D1P in a pair to the first and second differential signal contacts T19 and T20 as well. On this occasion, a clock signal (third clock signal) with a higher frequency than that of the SCLK contact TC07 or the SCL contact TC13 may be transmitted. The differential signals D1N and D1P, however, are pair signals, and hence a smaller amount of clock noise is radiated from them than from the SCLK contact TC07 and the SCL contact TC13 which transmit single end signals. Therefore, placing the mounting detection contact TC06 next to the SCLK contact TC07 achieves a higher effect of preventing a malfunction caused by clock noise than placing the mounting detection contact TC06 next to the first and second differential signal contacts TC19 and TC20.

It should be noted that the contact (first data contact) TC08 placed next to the SCLK contact TC07 and on the opposite side of the mounting detection contact TC06 transmits MOSI (first data signal). MOSI is a data signal, and hence it seems that it tends to be affected by clock noise. MOSI, however, is a data signal conforming to the same SPI communication standard as the clock signal transmitted by the SCLK contact TC07, and therefore, its potential varies synchronously with the clock signals. For this reason, MOSI does not tend to be affected by clock noise. The contact TC08 thus does not need to be fixed at the GND potential and can be used as a MOSI contact.

The accessory 200, which includes a battery 205, is supplied with power from the battery 205 and also supplied with power from the camera 100 via the camera-side connection unit 141 and the accessory-side connection unit 211. The accessory-side connection unit 211 is comprised of a microcomputer including a built-in CPU and controls the entire accessory 200.

An accessory power supply unit 202, which is comprised of a DC-DC converter, an LDR, a charge pump, or the like, generates power that is to be supplied to the components of the accessory 200. A voltage of 1.8 V generated by the accessory power supply unit 202 is constantly supplied as accessory microcomputer power supply VMCU_A to an accessory control unit 201. It should be noted that the voltage generated by the accessory power supply unit 202 may be a value different from 1.8 V. The accessory control unit 201 controls the accessory power supply unit 202 to control turning-on/off of the power to the component of the accessory 200.

A charging unit 204 is a circuit unit for charging the battery 205 with power supplied from the camera 100. When the accessory control unit 201 determines that power enough to charge the battery 205 has been supplied from the camera 100, it charges the battery 205 by controlling the charging unit 204. It should be noted that although in the present embodiment, it is assumed that the battery 205 is attached to the accessory 200, the accessory 200 may not be equipped with the battery 205 but may operate only with power supplied from the camera 100. In this case, the charging unit 204 can be dispensed with.

A differential communication unit 207, which is a circuit for carrying out differential communications with the camera 100, is capable of sending and receiving data to and from the camera 100. An external communication I/F unit 208 is an I/F (interface) for carrying out data communications with an external apparatus, which is not illustrated, and is, for example, an Ethernet communication I/F, a wireless LAN communication I/F, or a public network communication I/F. By controlling the differential communication unit 207 and the external communication I/F unit 208, the accessory control unit 201 is capable of sending data received from the camera 100 to the external apparatus and sending data received from the external apparatus to the camera 100. A function unit 206, which corresponds to an accessory main body, is a circuit unit that executes different functions depending on the type of the accessory 200. For example, the accessory 200 is a strobe, the function unit 206 functions as a light-emitting unit, a charging unit, and other relating units. When the accessory 200 is a microphone, the function unit 206 functions as an audio codec unit, a microphone unit, and other relating units.

An external connection terminal 209 that is a connector terminal for connecting to the external apparatus is, for example, a USB Type-C connector but is not limited to this. A connection detecting unit 210 detects connection of the external apparatus to the external connection terminal 209. The accessory control unit 201 is capable of detecting connection of the external apparatus to the external connection terminal 209 by receiving an output signal from the connection detecting unit 210. A power switch 203 is a switch for turning on and off operation of the accessory 200. The accessory control unit 201 is capable of detecting an on-position and an off-position by reading the signal level of a terminal to which the power switch 203 is connected.

Operation switches 212, which are operators allowing a user to operate the accessory 200, include a button, a cross key, a slide switch, a dial switch, and/or a touch sensor. Upon detecting that one of the operation switches 212 has been operated, the accessory control unit 201 carries out a predetermined process according to the operation.

The accessory-side connection unit 211 is a connector for electrically connected to the camera 100 via the twenty-one contacts TA01 to TA21 arranged in a row. The contacts TA01 to TA21 are arranged in this order from one end to the other in the direction in which they are arranged.

The contact TA01 is connected to the ground (GND) and acts not only as a contact at the reference potential but also as a contact that controls the wiring impedance for a differential signal MN and a differential signal D1P. The contact TA01 corresponds to a third ground contact.

The differential signal D1N connected to the contact TA02 and the differential signal D1P connected to the contact TA03 are differential data communication signals that pair up with each other to carry out data communications. The contacts TA02 and TA03 are connected to the differential communication unit 207. The contacts TA02 and TA03 and the contacts TA07 to TA17, TA19, and TA20 are communication contacts.

The contact TA04, which is a first ground contact, is connected to the GND and is a contact at the reference potential for the camera 100 and the accessory 200. The contact TA04 is placed outside of the contact TAOS in the direction in which the contacts are arranged. The accessory power supply unit 202 and the charging unit 204 are connected to the contact TAOS, which is a power supply contact, and accessory power supply VACC supplied from the camera 100 is connected to the contact TAOS.

The contact TA6, which is a mounting detection contact, is directly connected to the ground. When the accessory 200 has been mounted on the camera 100, the contact TA06 sets the accessory mounting detection signal/ACC_DET to the GND level (ground potential) as the low level and thus acts as a contact for causing the camera 100 to detect mounting of the accessory 200.

SCLK connected to the contact TA07, MOSI connected to the contact TA08, MISO connected to the contact TA09, and CS connected to the contact TA10 are signals for the accessory control unit 201 as a communication slave to carry out SPI communication.

A communication request signal/WAKE for the accessory control unit 201 to issue a communication request to the camera 100 is connected to the contact TA11. When the accessory control unit 201 determines that it is necessary to communicate with the camera 100, it issues the communication request to the camera 100 by outputting the communication request signal/WAKE at the low level.

In response to detection that the accessory 200 has been mounted, power is supplied from the camera control unit A 101 to the accessory 200 via the contact TC05. Then, by changing the signal level (potential) of the communication request signal/WAKE from the high level to the low level, the accessory control unit 201 notifies the camera control unit A 101 that power has been supplied.

By changing the signal level (potential) of the communication request signal/WAKE from the high level to the low level regardless of the absence of a request from the camera 100, the accessory control unit 201 is able to provide notification that a cause that the accessory 200 needs to communicate with the camera 100 has occurred. This arrangement allows the camera control unit A 101 to omit the operation of periodically checking by polling whether or not a cause for the communicate has occurred in the accessory 200. Moreover, when a cause for the communication has occurred in the accessory 200, the accessory 200 can notify the camera 100 of the occurrence accordingly in real time.

SDA connected to the contact TA12 and SCL connected to the contact TA13 are signals for the accessory control unit 201 as a communication slave to carry out I2C communication.

An FNC1 signal connected to the contact TA14, an FNC2 signal connected to the contact TA15, an FNC3 signal connected to the contact TA16, and an FNC4 signal connected to the contact TA17 are function signals capable of handling functions that vary according to the type of the mounted accessory 200. For example, when the accessory 200 is a microphone, those function signals are audio data signals, and when the accessory 200 is a strobe unit, they are strobe firing timing signals that provide notification of strobe firing timing. It should be noted that communication of the function signals is implemented by the accessory control unit 201 outputting information indicating a contact that is used in execution of functions of a mounted accessory among the plurality of contacts TA01 to TA21 to the corresponding contact of the camera-side connection unit 141 via another contact of the plurality of contacts TA01 to TA21, that is, via a contact different from the contact indicated by the information.

The contact TA18, which is a second ground contact, is also connected to the GND, and as with the contact TA04, the contact TA18 is a contact at the reference potential for the camera 100 and the accessory 200. A differential signal D2N connected to the contact TA19 and a differential signal D2P connected to the contact TA20 are data communication signals that pair up with each other to carry out data communications and are connected to the external connection terminal 209.

The contact TA21, which is connected to the GND, acts not only as a contact at the reference potential but also as a contact that controls the wiring impedance for the differential signal D2N and the differential signal D2P. The contact TA21 corresponds to a fourth ground contact.

The contacts TA01, TA04, TA06, TA08, and TA21 are connected to, for example, a GND area of a flexible board, and the GND area of the flexible board is fixed to a metallic member, which is at the GND level of the accessory 200, by screws or the like, which is not illustrated. Examples of the metallic member at the GND level include a shoe mounting foot that engages with an accessory shoe of the camera 100 and a base plate, which is not illustrated, inside the accessory 200.

In the present embodiment, the camera 100 and the accessory 200 support two types of communication protocols as SPI communication modes. The first communication protocol is a mode in which before outputting the SCLK signal, the camera 100 does not check if the accessory 200 is ready to communicate, and in the description of the present embodiment, this is referred to as the SPI protocol A. The second communication protocol is a mode in which before outputting the SCLK signal, the camera 100 checks if the accessory 200 is ready to communicate, and in the description of the present embodiment, this is referred to as the SPI protocol B.

The camera 100 includes built-in accessories 151 and 152. For example, the built-in accessories 151 and 152 are a built-in microphone and a built-in strobe, respectively. The camera 100 may be equipped with any number of built-in accessories.

Figure 2A:
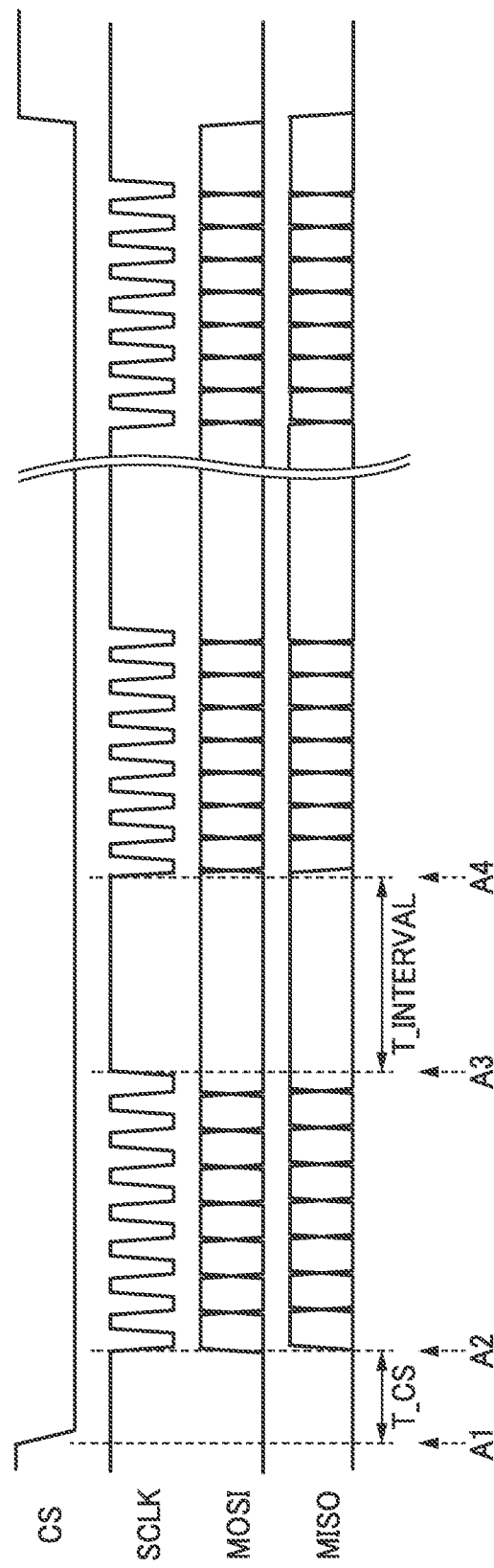
FIGS. 2A and 2B are views schematically illustrating communication waveforms in SPI protocols A and B.
Figure 2B:
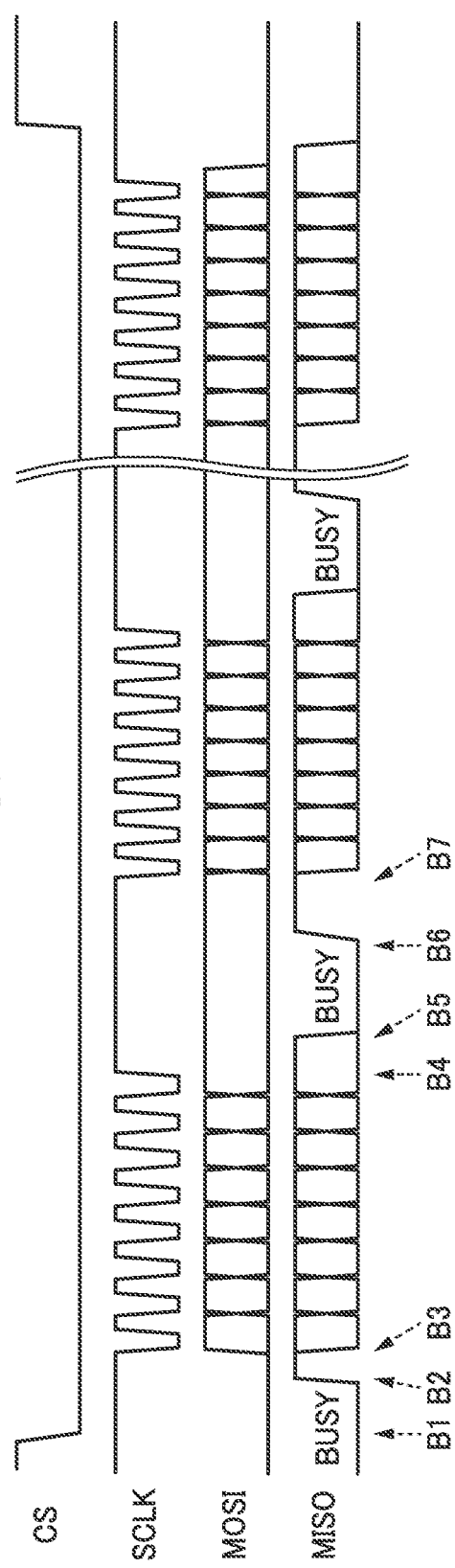

FIG. 2A is a schematic view illustrating communication waveforms in the SPI protocol A. FIG. 2B is a schematic view illustrating communication waveforms in the SPI protocol B. In FIGS. 2A and 2B, it is assumed that the CS signal is an active low signal.

First, as illustrated in FIG. 2A, in the SPI protocol A, the camera control unit B 102 changes the CS signal to the low level to issue an SPI communication request to the accessory control unit 201 at the time A1.

At the time T2 that is a predetermined time T_CS after the time A1, the camera control unit B 102 starts outputting the SCLK signal and the MOSI signal. Likewise, upon detecting falling of the SCLK signal, the accessory control unit 201 starts outputting the MOSI signal.

The camera control unit B 102 stops outputting SCLK at the time A3 at which SCLK for one byte is completed. The camera control unit B 102 does not output SCLK until a predetermined time T_INTERVAL elapses since the time A3, and when the predetermined time T_INTERVAL has elapsed, the camera control unit B 102 resumes outputting SCLK and performs communication of the next one byte.

Figure 3A:
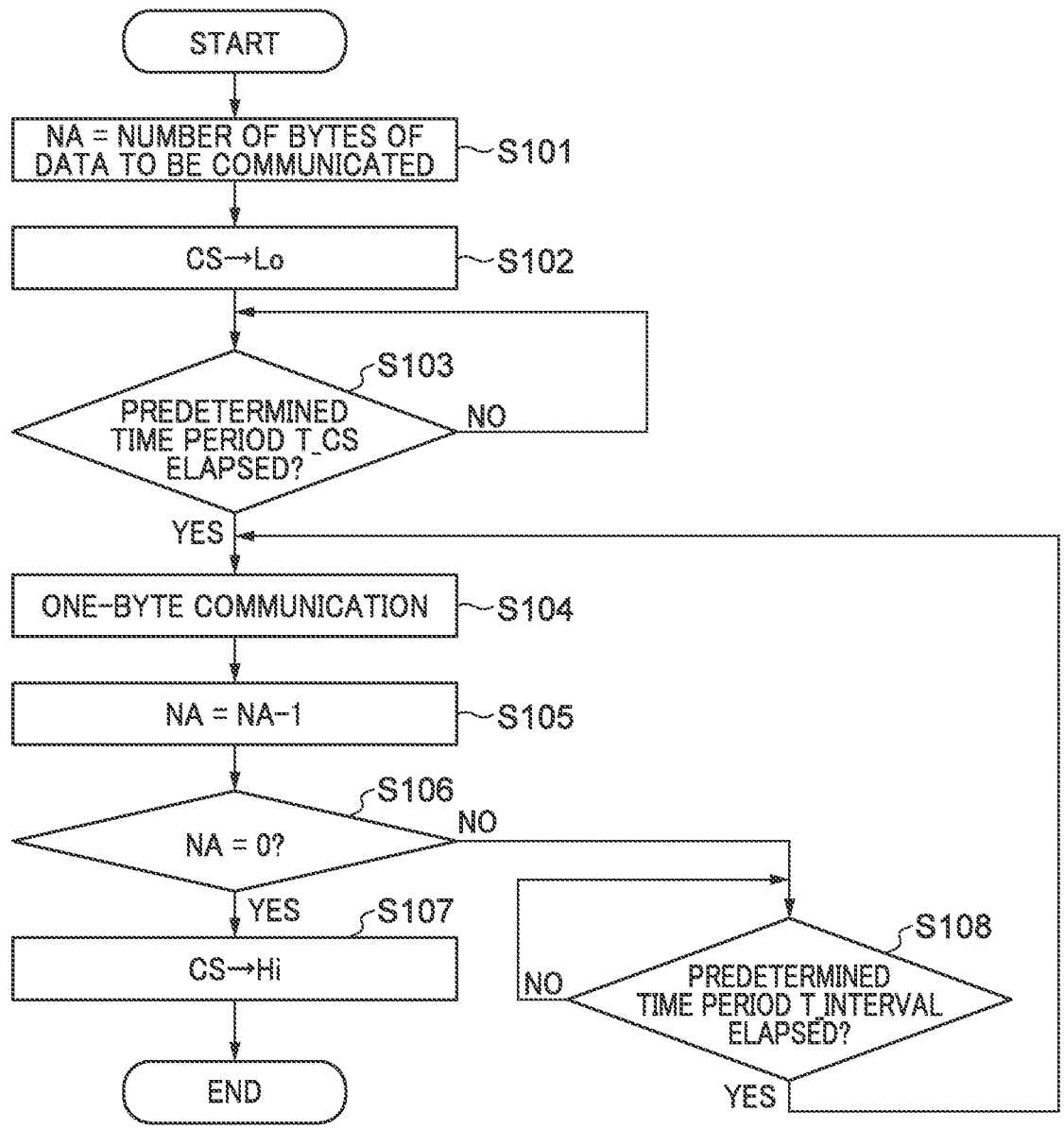
FIGS. 3A and 3B are flowcharts illustrating a process carried out by a camera control unit B and a process carried out by an accessory control unit, in the SPI protocol A.

FIG. 3A is a flowchart illustrating a process that is carried out by the camera control unit B 102 in the SPI protocol A. This process is implemented by the CPU (which is not illustrated) in the camera control unit B 102 loading a program stored in a ROM (not illustrated) in the camera control unit B 102 to a RAM (which is not illustrated) in the camera control unit B 102 and executing the same.

In step S101, the camera control unit B 102 stores a numeric value, which represents the number of bytes of data to be communicated, in a variable NA. For example, when three bytes are to be communicated, 3 is stored in the variable NA. In step S102, the camera control unit B 102 changes the CS signal to the low level (Lo) and requests SPI communication.

In step S103, the camera control unit B 102 stands by until the predetermined time T_CS has elapsed since the CS signal changes to the low level, and after the lapse of the predetermined time T_CS, the process proceeds to step S104. In the step S104, to perform communication of one-byte data, the camera control unit B 102 controls output of SCLK and also controls output of MOSI data and input of MISO data.

In step S105, the camera control unit B 102 stores a numeric value, which is obtained by subtracting 1 from the numeric value of the variable NA, in the variable NA to update the variable NA. In the step S106, the camera control unit B 102 determines whether or not the variable NA has become zero. When the variable NA has become zero, the process proceeds to step S107, and when the variable NA is not zero, the process proceeds to step S108.

In the step S108, the camera control unit B 102 stands by until the predetermined time T_INTERVAL has elapsed since the communication of the one-byte data was completed in the step S104, and after the lapse of the predetermined time T_INTERVAL, the process returns to the step S104. In the step S107, the camera control unit B 102 changes the CS signal to the high level (Hi) and ends the sequence of SPI communication in FIG. 3A.

Figure 3B:
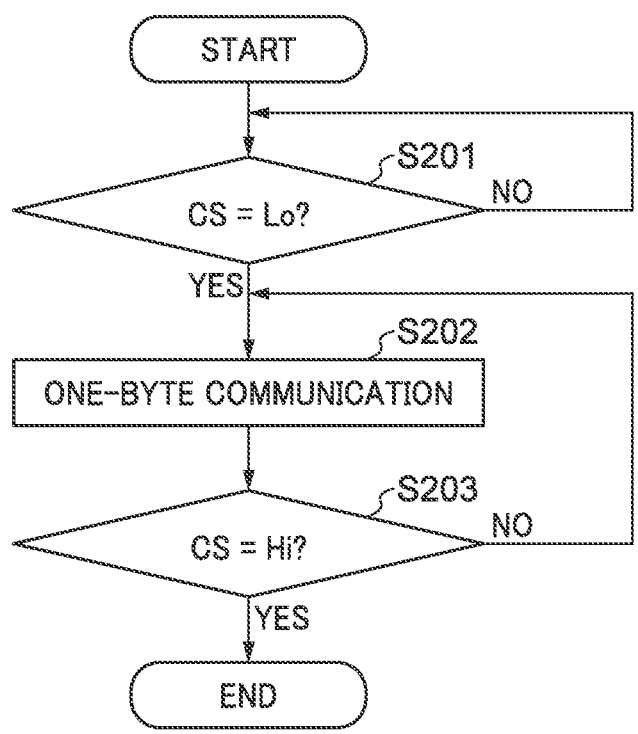

FIG. 3B is a flowchart illustrating a process that is carried out by the accessory control unit 201 in the SPI protocol A. This process is carried out in parallel with the process in FIG. 3A. This process is implemented by the CPU (which is not illustrated) in the camera control unit B 102 loading a program stored in the ROM (which is not illustrated) in the accessory control unit 201 to the RAM (which is not illustrated) in the accessory control unit 201 and executing the same.

In step S201, the accessory control unit 201 stands by until the CS signal has changed to the low level (Lo), and when the CS signal has changed to the low level, the process proceeds to step S202. In step S202, in response to input of the SCLK signal, the accessory control unit 201 controls input of MOSI data and output of MISO data and performs communication of one-byte data.

In step S203, the accessory control unit 201 determines whether or not the CS signal has changed to the high level (Hi). When the CS signal has not changed to the high level, the process returns to the step S202, in which the accessory control unit 201 performs communication of next one-byte data, and when the CS signal has changed to the high level, the accessory control unit 201 ends the sequence of SPI communication in FIG. 3B.

A description will now be given of the SPI protocol B. As illustrated in FIG. 2B, in the SPI protocol B, the camera control unit B 102 changes the CS signal to the low level (Lo) to issue an SPI communication request to the accessory control unit 201 at the time B1. The camera control unit B 102 checks the potential of the MISO signal at the same time when it issues the SPI communication request. When the MISO signal is at the high level, the camera control unit B 102 determines that the accessory control unit 201 is ready to communicate, and when the MISO signal is at the low level, the camera control unit B 102 determines that the accessory control unit 201 is not ready to communicate.

Upon detecting falling of the CS signal, the accessory control unit 201 controls MISO to the high level when SPI communication is possible, and controls MISO to the low level when SPI communication is impossible (the time B2).

At the time B3, upon checking that the MISO signal is at the high level, the camera control unit B 102 starts outputting the SCLK signal and the MOSI signal. Likewise, upon detecting falling of the SCLK signal, the accessory control unit 201 starts outputting the MISO signal.

When the output of SCLK for one byte is completed at the time B4, the camera control unit B 102 stops outputting SCLK. After sending and receiving one-byte data, the accessory control unit 201 controls the MISO signal to the high level when SPI communication is possible, and controls the MISO signal to the low level when SPI communication is impossible (the times B5, B6).

At the time B7, the accessory control unit 201 checks the potential of the MISO signal. When the MISO signal is at the high level, the camera control unit B 102 determines that the accessory control unit 201 is ready to communicate, and when the MISO signal is at the low level, the camera control unit B 102 determines that the accessory control unit 201 is not ready to communicate.

Figure 4A:
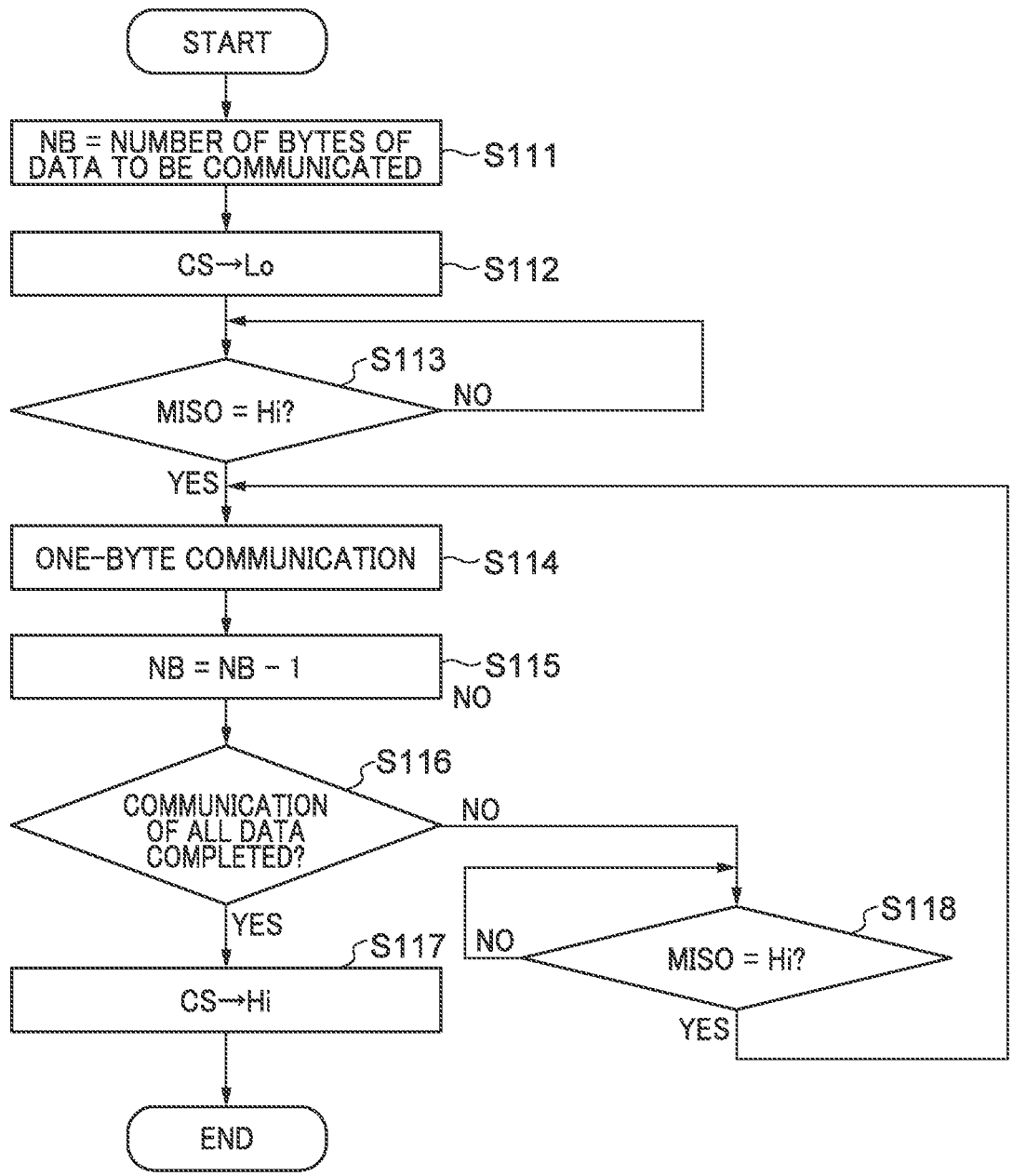
FIGS. 4A and 4B are flowcharts illustrating a process carried out by the camera control unit B and a process carried out by the accessory control unit, in the SPI protocol B.

FIG. 4A is a flowchart illustrating a process that is carried out by the camera control unit B 102 in the SPI protocol B. This process is implemented by the CPU (which is not illustrated) in the camera control unit B 102 loading a program stored in the ROM (which is not illustrated) in the camera control unit B 102 to the RAM (which is not illustrated) in the camera control unit B 102 and executing the same.

In step S111, the camera control unit B 102 stores a numeric value, which represents the number of bytes of data to be communicated, in a variable NB. For example, when three bytes are to be communicated, 3 is stored in the variable NB. In step S112, the camera control unit B 102 changes the CS signal to the low level (Lo) and requests SPI communication. In step S113, the camera control unit B 102 stands by until the MISO signal has changed to the high level (Hi), and when the MISO signal has changed to the high level, the process proceeds to step S114.

In the step S114, to perform communication of one-byte data, the camera control unit B 102 controls output of SCLK and also controls output of MOSI data and input of MISO data. In step S115, the camera control unit B 102 stores a numeric value, which is obtained by subtracting 1 from the numeric value of the variable NB, in the variable NB to update the variable NB. In the step S116, the camera control unit B 102 determines whether or not communication of all data has been completed (the variable NB has become zero). When the variable NB has become zero, it is determined that communication of all data has been completed.

When the camera control unit B 102 determines that communication of all data has been completed, the process proceeds to step S117, and when the camera control unit B 102 determines that communication of all data has been completed, the process proceeds to step S118. In the step S118, the camera control unit B 102 stands by until the MISO signal has changed to the high level (Hi), and when the MISO signal has changed to the high level, the process returns to the step S114. In the step S117, the camera control unit B 102 changes the CS signal to the high level (Hi) and ends the sequence of SPI communication in FIG. 4A.

Figure 4B:
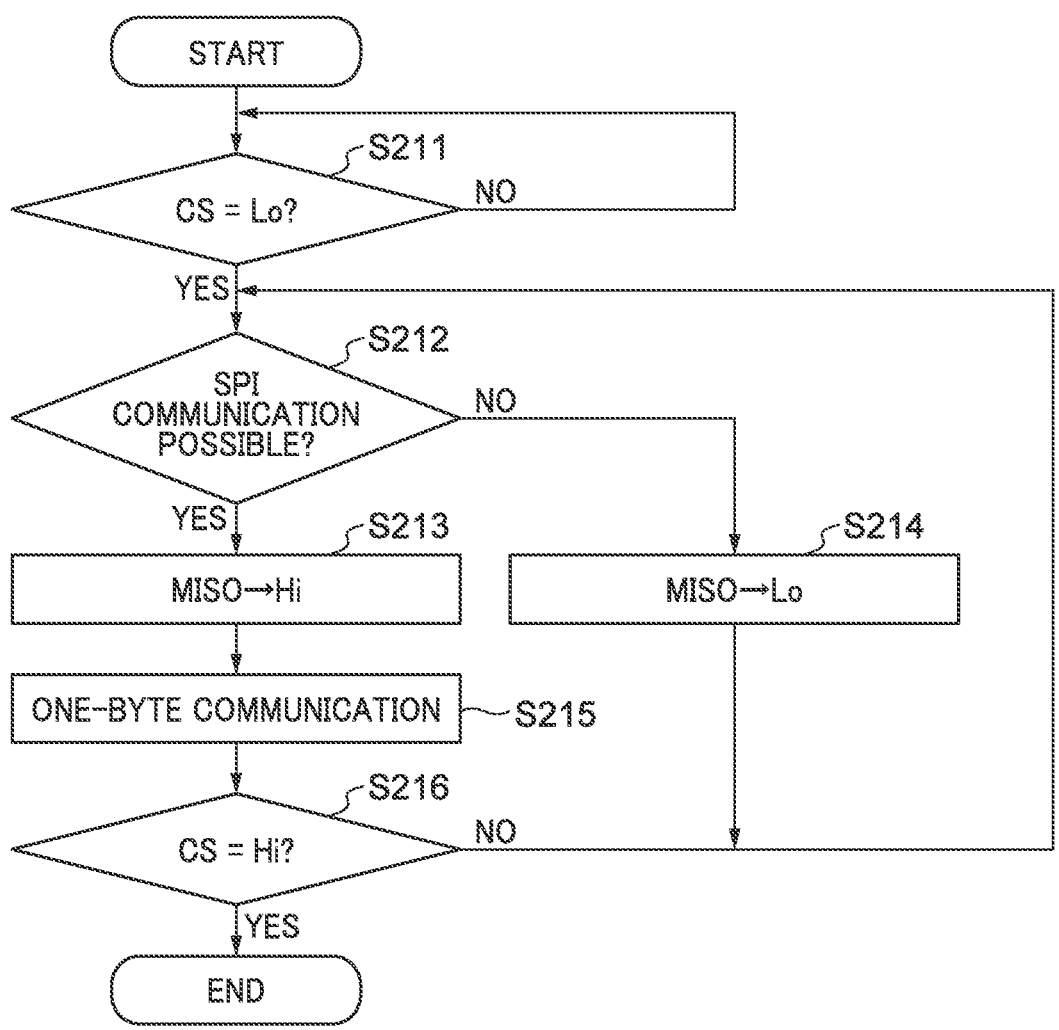

FIG. 4B is a flowchart illustrating a process that is carried out by the accessory control unit 201 in the SPI protocol B. This process is carried out in parallel with the process in FIG. 4A. This process is implemented by the CPU (which is not illustrated) in the accessory control unit 201 loading a program stored in the ROM (which is not illustrated) in the accessory control unit 201 to the RAM (which is not illustrated) in the accessory control unit 201 and executing the same.

In step S211, the accessory control unit 201 stands by until the CS signal has changed to the low level (Lo), and when the CS signal has changed to the low level, the process proceeds to step S212. In the step S212, the accessory control unit 201 determines whether or not SPI communication is possible. When SPI communication is possible, the process proceeds to step S213, and when SPI communication is impossible, the process proceeds to step S214.

In the step S213, the accessory control unit 201 controls the MISO signal to the high level (Hi), followed by the process proceeding to step S215. In the step S214, the accessory control unit 201 controls the MISO signal to the low level (Lo), followed by the process returning to the step S212. In the step S215, in response to input of the SCLK signal, the accessory control unit 201 controls input of MOSI data and output of MISO data and performs communication of one-byte data.

In the step S216, the accessory control unit 201 determines whether or not the CS signal has changed to the high level (Hi). When the accessory control unit 201 determines that the CS signal has not changed to the high level, the process returns to the step S212, in which the accessory control unit 201 in turn performs communication of next one-byte data, and when the CS signal has changed to the high level, the accessory control unit 201 ends SPI communication in FIG. 4B.

FIG. 5 is a view illustrating details of communication carried out when the camera 100 notifies the accessory 200 of an operation execution command via SPI communication.

In the communication of the first byte, the camera control unit B 102 sends information CMD indicating a command number as MOSI data. On the other hand, the accessory control unit 201 sends the value of 0xA5, which is information indicating that communication is possible, as MISO data. When it is impossible to carry out a communication process for the first byte, the accessory control unit 201 sends a value other than the value of 0xA5 as MISO data.

In the communication of the second byte, the camera control unit B 102 sends an argument MOSI_DATA1 corresponding to the command number CMD. Similarly, for the third to (N−2)-th bytes, the camera control unit B 102 sends arguments MOSI_DATA2 to MOSI_DATA3[N−3] corresponding to the command number CMD.

On the other hand, in the communication of the second byte, the accessory control unit 201 sends the command number CMD, which was received as the first byte, as MISO data. This enables the camera control unit B 102 to determine whether or not the accessory control unit 201 has properly received the MOSI data.

In the communication of the third byte, the accessory control unit 201 sends a return value MISO_DATA1 corresponding to the command number CMD as MISO data. Likewise, in the communication of the fourth to (N−2)-th bytes, the accessory control unit 201 sends arguments MISO_DATA2 to MISO_DATA[N−4] corresponding to the command number CMD. It should be noted that the number of arguments and return values is determined in advance for each command number. Either arguments or return values may be dispensed with.

In a communication of the (N−1)-th byte, the camera control unit B 102 sends "Checksum_C", which is checksum data, as MOSI data. This "Checksum_C" is calculated by the camera control unit B 102 according to the expression (1) below based on data that is sent from the camera control unit B 102 to the accessory control unit 201. On the other hand, the accessory control unit 201 sends a value of "0x00" as MISO data.

In the communication of the N-th byte, the camera control unit B 102 sends "0x00" as MOSI data. On the other hand, the accessory control unit 201 sends "Checksum_A", which is checksum data, as MISO data.

Checksum_A is first Checksum_A calculated according to the expression (2) below or second Checksum_A calculated according to the expression (3) below. Namely, the accessory control unit 201 calculates Checksum_C_A based on actually-received data. Then, the accessory control unit 201 judges whether or not received Checksum_C matches Checksum_C_A calculated from the received data. When Checksum_C matches Checksum_C_A, the accessory control unit 201 calculates first Checksum_A according to the expression (2) below and sends it to the camera control unit B 102.

On the other hand, when Checksum_C does not match Checksum_C_A, the accessory control unit 201 calculates second Checksum_A according to the expression (3) below and sends it to the camera control unit B 102.

$$\mathrm{CheckSum\_}C\mathrm{=EXOR(AND(SUM(CMD,} \\ \mathrm{MOSI\_DATA1,\ldots,MOSI\_DATA}[N-3]), \\ 0xFF),0xFF) \quad (1)$$

$$\mathrm{CheckSum\_}A\mathrm{=EXOR(AND(SUM(}0xA5,\mathrm{CMD,} \\ \mathrm{MISO\_DATA1,\ldots,MISO\_DATA}[N-4]), \\ 0xFF),0xFF) \quad (2)$$

$$\mathrm{CheckSum\_}A\mathrm{=AND(SUM(}0xA5,\mathrm{CMD,} \\ \mathrm{MISO\_DATA1,\ldots,MISO\_DATA}[N-4]),0xFF) \quad (3)$$

FIG. 6 is a view illustrating an example of accessory information. The accessory information is stored in a non-volatile memory, which is not illustrated, in the accessory 200. The accessory information is information for the camera 100 to identify the type of the accessory 200 and the specifications of the accessory 200 relating to communications and operations (functions). The accessory information is mapped in a memory space at addresses 0x00 to 0x0F. The accessory information can be read from the accessory 200 via I2C communication. It should be noted that, in I2C communication according to the present embodiment, a checksum value for data that has been read is added to the final data for communication. Detailed description of the accessory information will be given later.

FIG. 7 is a view illustrating a sequence performed when the accessory 200 has been mounted on the camera 100. The outline of the sequence performed when the accessory 200 has been mounted on the camera 100 will be described here, and detailed description of processes carried out by the camera 100 and the accessory 200 will be given later.

When the accessory 200 has been mounted on the camera 100, the accessory mounting detection signal/ACC_DET becomes the GND level, and the camera control unit A 101 determines that the accessory 200 has been mounted on the camera 100. Upon determining that the accessory 200 has been mounted on the camera 100, the camera control unit A 101 changes a power supply control signal CNT_VACC1 to the high level so as to turn on output from the accessory-use power supply unit A 131. The accessory-use power supply unit A 131 outputs the accessory power supply VACC in response to the power supply control signal CNT_VACC1 becoming the high level.

In the accessory 200, when the accessory power supply unit 202 receives the accessory power supply VACC, it generates the power supply VMCU_A for the accessory control unit 201. As a result, the accessory control unit 201 starts working. After starting to work, the accessory control unit 201 initializes each block in the accessory 200. The accessory control unit 201 changes a/WAKE terminal to the low level. In the camera 100, when the camera control unit A 101 detects that the/WAKE terminal has changed to the low level, it detects that the accessory 200 has become ready to communicate.

The camera control unit A 101 issues an accessory information request to the accessory 200 via I2C communication. In the accessory 200, the accessory control unit 201 sends the accessory information in response to the accessory information request from the camera 100. After sending the accessory information, the accessory control unit 201 changes the communication request signal/WAKE to the high level.

In the camera 100, the camera control unit A 101 analyzes the received accessory information to determine, for example, whether or not it is possible to control the mounted accessory 200. The camera control unit A 101 also turns on the accessory-use power supply unit B 132. Upon completing a variety of settings on the camera 100 (in-camera settings), the camera control unit A 101 notifies the camera control unit B 102 of the accessory information.

Based on accessory type information (ACC type information) indicating an accessory type, the camera control unit B 102 provides notification of a control command to the accessory 200 via SPI communication and also controls a function signal according to a received event. The accessory control unit 201 gives a response (event) to a control command issued by the camera 100 via SPI communication and performs control according to the function signal.

FIG. 8 is a view illustrating examples of accessory type information. D7-D0 data at the address 0x00 in the accessory information illustrated in FIG. 6 is the accessory type information (ACC type information). In FIG. 8, numbers correspond to respective accessory types. For example, the numbers 0x81, 0x82, and 0x83 indicate a strobe, an interface conversion adapter, and a microphone, which are accessories, respectively. The number 0x84 indicates a multi-accessory connection adapter, which is an accessory, for mounting a plurality of accessories on the camera 100. Here, the adapter is an intermediate accessory mounted between the camera 100 and an accessory like a strobe or a microphone. The interface conversion adapter is a device for, when an interface of the camera 100 and an interface of an accessory are different, converting the interfaces so as to make the camera and the accessory compatible with each other.

In FIG. 6, D7-D0 data at the address 0x01 is information indicating an accessory identification number (ACC identification number). An accessory model can be uniquely identified with the accessory type information and the accessory identification number. D7-D0 data at the address 0x02 is information indicating a firmware version of the accessory 200.

D7-D6 data at the address 0x03 is information indicating whether or not to request supply of the accessory power supply VACC to the accessory 200 in a state where a power switch, which is not illustrated, of the camera 100 is off. When this information is "0", it indicates that it is unnecessary to supply power, when this information is "1", it indicates that supply of power from the accessory-use power supply unit A 131 is requested, and when this information is "2", it indicates that supply of power from the accessory-use power supply unit B 132 is requested.

D5-D4 data at the address 0x03 is information indicating whether or not to request supply of the accessory power supply VACC to the accessory 200 in a state where the camera 100 is in a power-saving mode (auto-off mode). When this information is "0", it indicates that it is unnecessary to supply power, when this information is "1", it indicates that supply of power from the accessory-use power supply unit A 131 is requested, and when this information is "2", it indicates that supply of power from the accessory-use power supply unit B 132 is requested.

D3-D2 data at the address 0x03 is information indicating whether or not the accessory 200 is equipped with the battery 205. When this information is "0", it indicates that the accessory 200 is not equipped with the battery 205, and when this information is "1", it indicates that the accessory 200 is equipped with the battery 205. D1-D0 data at the address 0x03 is information indicating whether or not the accessory 200 is equipped with a function of charging the battery 205. When this information is "0", it indicates that the accessory 200 is not equipped with the charging function, and when this information is "1", it indicates that the accessory 200 is equipped with the charging function.

D7-D0 data at the address 0x04 is information indicating power requested of the accessory power supply VACC supplied from the camera to the accessory 200. For example, a value obtained by multiplying this information by 10 represents a current value; when this information is 10, it indicates that the current value is 100 mA, and when this information is 100, it indicates that the current value is 1A. It should be noted that to reduce the amount of data in this information, this information and a freely-defined current values may be associated with each other. For example, when the information shows the values of "0", "2", "3", and "4", they may indicate 100 mA, 300 mA, 450 mA, and 600 mA, as requested power, respectively.

D7 data at the address 0x05 is information indicating whether or not the accessory 200 is in a firmware update mode. When this information is "0", it indicates that the accessory 200 is not in the firmware update mode, and when this information is "1", it indicates that the accessory 200 is in the firmware update mode. D6 data at the address 0x05 is information indicating whether or not the accessory 200 is equipped with a firmware update function. When this information is "0", it indicates that the accessory 200 is not equipped with the firmware update function, and when this information is "1", it indicates that the accessory 200 is equipped with the firmware update function.

D5-D4 data at the address 0x05 is information indicating whether or not the accessory 200 allows operation of an intermediate connection accessory when it has been mounted on the accessory 200. When this information is "0", it indicates that the operation is not allowed, and when this information is "1", it indicates that the operation is allowed. D3-D2 data at the address 0x05 is information indicating whether or not the accessory 200 needs to check if an intermediate connection accessory has been mounted on it when the camera 100 is started. When this information is "0", it indicates that the checking is not needed, and when this information is "1", it indicates that the checking is needed.

D1-D0 data at the address 0x05 is information indicating whether or not the accessory 200 supports command notification via I2C communication. When this information is "0", it indicates that the accessory 200 does not support command notification, and when this information is "1", it indicates that the accessory 200 supports command notification.

D5-D4 data at the address 0x06 is information indicating a communication mode in which after the accessory 200 notifies the camera 100 of the communication request signal/WAKE, it is possible to notify the camera 100 of a cause to request communication. When the information shows the values of "0", "1", and "2", it indicates that I2C communication is supported, that SPI communication is supported, and that both I2C communication and SPI communication are supported, respectively.

D0, D1, D2, and D3 data at the address 0x06 are information indicating whether or not the accessory 200 is equipped with functions using the FNC1 signal, FNC2 signal, FNC3 signal, and FNC4 signal, respectively. The D0 data corresponds to the FNC1 signal, the D1 data corresponds to the FNC2 signal, and the D3 data corresponds to the FNC4 signal. When the data value is "0", it indicates that the accessory 200 is not equipped with the corresponding function, and when the data value is "1", it indicates that the accessory 200 is equipped with the corresponding function.

D7 data at the address 0x0A is information indicating whether or not to request the camera 100 to start when the accessory 200 notifies the camera 100 of the communication request signal/WAKE. When the information shows the values of "0" and "1", it indicates that the camera 100 is to be requested to start and that the camera 100 is not to be requested to start, respectively.

D6-D1 data at the address 0x0A is information indicating a cause for the communication request signal/WAKE of which the camera 100 has been notified by the accessory 200.

FIG. 9 is a view illustrating examples of a cause for the communication request signal/WAKE. In the examples, the accessory 200 is a microphone. For example, the cause number 0x00 is a number indicating that a menu call switch (SW) has been depressed among the operation switches 212. The cause number 0x01 is a number indicating that the accessory 200 has completed output control for an audio signal. The cause number 0x02 is a number indicating that the accessory 200 has completed a muting process for an audio signal. In this manner, the camera 100 can be notified of information about a cause to generate the communication request signal/WAKE.

D1 data at the address 0x0C in FIG. 6 is information indicating the SPI communication protocol supported by the accessory 200. When the information shows the values of "0" and "1", it indicates that the accessory 200 supports the SPI communication protocol A and that the accessory 200 supports the SPI communication protocol B, respectively.

D0 data at the address 0x0C is information indicating a control logic for the CS signal in the SPI communication protocol supported by the accessory 200. When the information shows the values of "0" and "1", it indicates that the CS signal is an active low signal and that the CS signal is ab active high signal, respectively.

D7-D0 data at the address 0x0D is information indicating a time period that is required as a communication byte interval in a case where the accessory 200 performs communication using the SPI communication protocol A and D7 data at the address 0x05 is "0". D7 data at the address 0x05 being "0" means that the accessory 200 is not in the firmware update mode as described above.

D7-D0 data at the address 0x0E is information indicating a time period that is required as a communication byte interval in a case where the accessory 200 performs communication using the SPI communication protocol A and D7 data at the address 0x05 is "1". D7 data at the address 0x05 being "1" means that the accessory 200 is in the firmware update mode as described above.

FIG. 10A is a view illustrating the relationship between communication bytes and communication intervals relating to data at the address 0x0D. FIG. 10B is a view illustrating the relationship between communication bytes and communication intervals relating to data at the address 0x0E.

D7-D0 data at the address 0x0F in FIG. 6 is information indicating a checksum.

Figure 11:
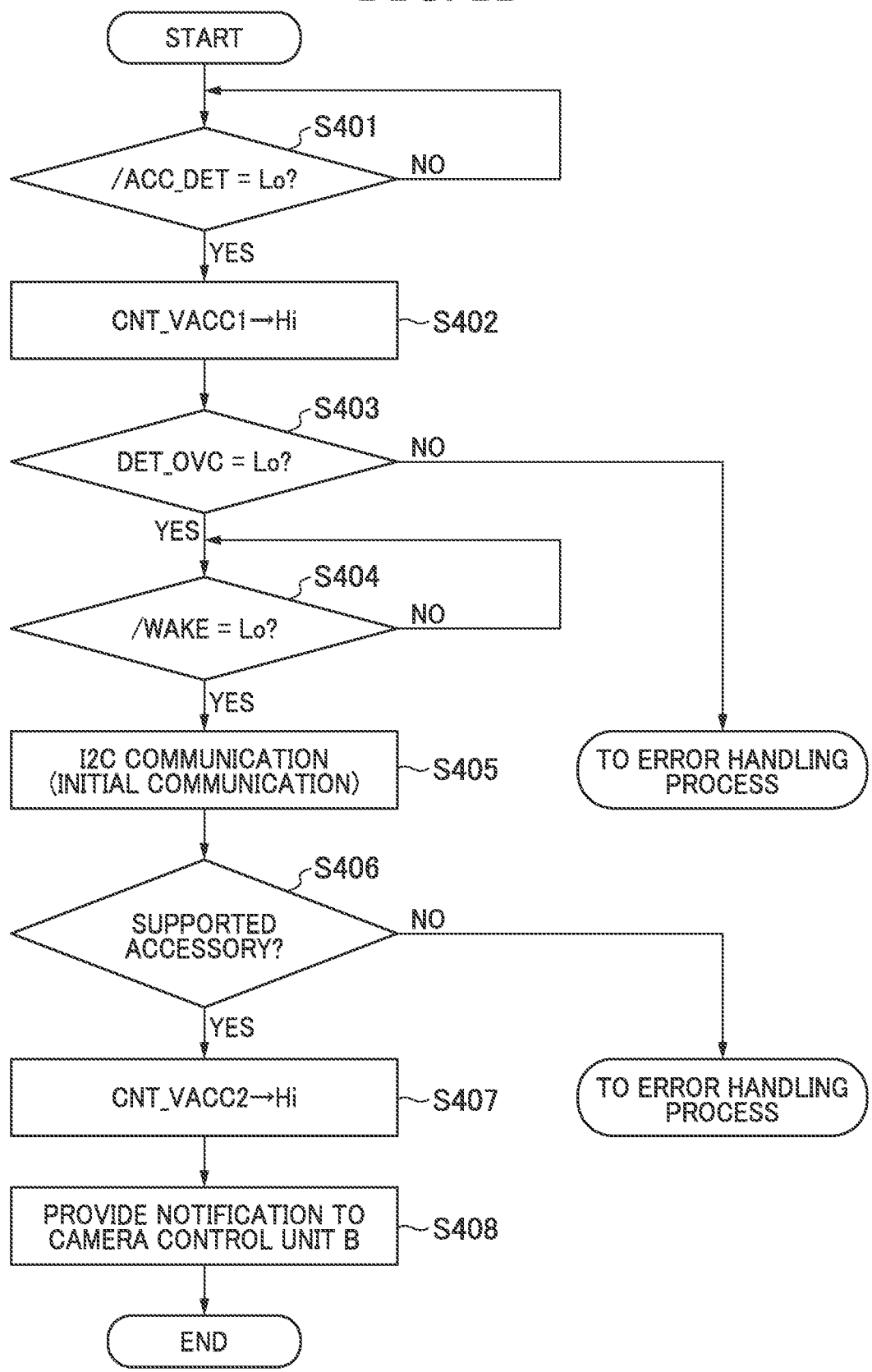
FIG. 11 is a flowchart illustrating a first process for accessory mounting.

FIG. 11 is a flowchart illustrating a first process for accessory mounting. This flowchart illustrates a process carried out by the camera control unit A 101 while the accessory 200 is mounted on the camera 100 and then functions of the accessory 200 are activated. The first process is implemented by the CPU (which is not illustrated) in the camera control unit A 101 loading a program stored in the ROM (which is not illustrated) in the camera control unit A 101 to the RAM (which is not illustrated) in the camera control unit A 101 and executing the same. This process is started when the main power to the camera 100 has been turned on or when the camera 100 has returned from the auto-off mode (power-saving mode). It should be noted this process is carried out substantially in steps S2001 and S2005 in FIG. 15, which will be described later.

In step S401, the camera control unit A 101 monitors the signal level of the accessory mounting detection signal/ACC_DET and stands by until the signal level becomes low (Lo). Namely, the camera control unit A 101 stands by until the accessory 200 is mounted. When the signal level of the accessory mounting detection signal/ACC_DET is high (Hi), it is determined that the accessory 200 has not been mounted, and when the signal level of the accessory mounting detection signal/ACC_DET is low, it is determined that the accessory 200 has been mounted, followed by the process proceeding to step S402.

In the step S402, the camera control unit A 101 controls the power supply control signal CNT_VACC1 to the high level (Hi) so as to turn on output from the accessory-use power supply unit A 131, followed by the process proceeding to step S403. The accessory-use power supply unit A 131 outputs the accessory power supply VACC when the power supply control signal CNT_VACC1 becomes the high level.

In the step S403, the camera control unit A 101 monitors the signal level of the overcurrent detection signal/DET_OVC and determines whether or not the signal level is low (Lo). When the signal level is low, it is determined that no overcurrent flows, and hence the process proceeds to step S404. When the signal level is high (Hi), it is determined that an overcurrent flows, and hence the camera control unit A 101 ends the process in FIG. 11 and proceeds to an error handling process which is not illustrated.

In the step S404, the camera control unit A 101 monitors the signal level of the communication request signal/WAKE, which is a notification signal from the accessory 200, and stands by until the signal level becomes low (Lo), i.e., until initialization of the accessory 200 has been completed. When the signal level has become low, the camera control unit A 101 determines that initialization of the accessory 200 has been completed, followed by the process proceeding to step S405.

It should be noted that if, in the step S404, the signal level of the communication request signal/WAKE does not become low even after a lapse of a predetermined time period, the camera control unit A 101 may proceed to an error handling process which is not illustrated. It should be noted that in each error handling process, the camera control unit A 101 notifies a user by display or sound that the mounted accessory 200 is not ready for effective use.

In the step S405, the camera control unit A 101 communicates with the accessory 200 via I2C and thus reads accessory information of fifteen bytes. Namely, the camera control unit A 101 issues an accessory information request to the accessory 200. In the accessory 200, the accessory control unit 201 sends accessory information in response to the accessory information request from the camera 100.

In step S406, based on the accessory information obtained in the step S405, the camera control unit A 101 determines whether or not the mounted accessory 200 is an accessory that is supported by the camera 100. When the camera control unit A 101 determines that the mounted accessory 200 is an accessory that is supported by the camera 100, the process proceeds to step S407. On the other hand, when the camera control unit A 101 determines that the mounted accessory 200 is an accessory that is not support by the camera 100, it ends the process in FIG. 11 and proceeds an error handling process which is not illustrated. It should be noted that in this error handling process, the camera control unit A 101 uses a message or sound to notify a user that the mounted accessory 200 is not ready for effective use.

In step S407, the camera control unit A 101 changes a power supply control signal CNT_VACC2 to the high level (Hi) so as to turn on output from the accessory-use power supply unit A 131, followed by the process proceeding to step S408. When the power supply control signal CNT_VACC2 becomes the high level, the accessory-use power supply unit B 132 outputs the accessory power supply VACC. In the present embodiment, when both the power supply control signal CNT_VACC1 and the power supply control signal CNT_VACC2 are controlled to the high level, the accessory-use power supply unit B 132 outputs the accessory power supply VACC.

In the step S408, the camera control unit A 101 notifies the camera control unit B 102 of the accessory information read in the step S405 and ends the process in FIG. 11.

Figure 12:
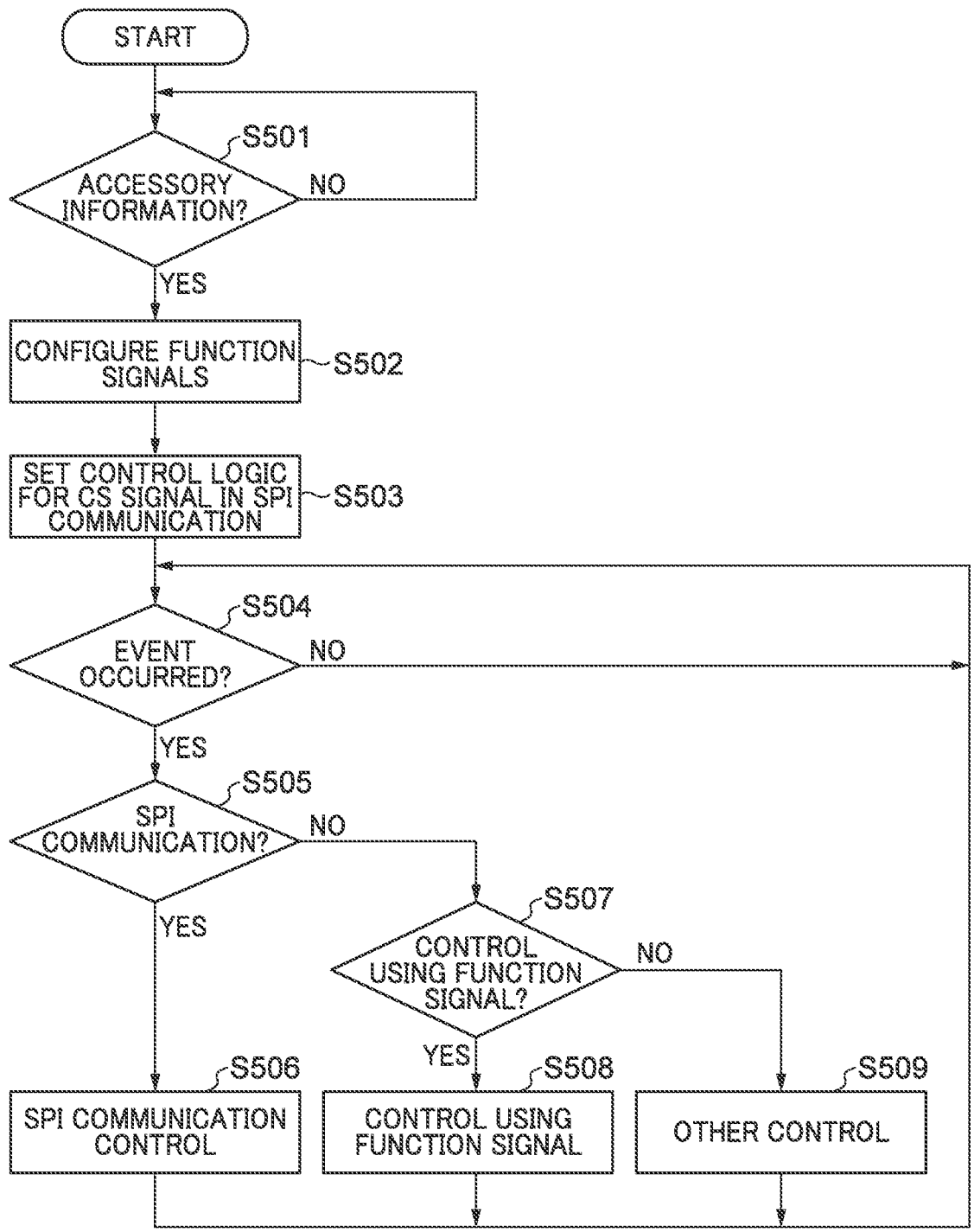
FIG. 12 is a flowchart illustrating a second process for accessory mounting.

FIG. 12 is a flowchart illustrating a second process for accessory mounting. This flowchart illustrates a process carried out by the camera control unit B 102 while the accessory 200 is mounted on the camera 100 and then functions of the accessory 200 are activated. The second process is implemented by the CPU (which is not illustrated) in the camera control unit B 102 loading a program stored in the ROM (which is not illustrated) in the camera control unit B 102 to the RAM (which is not illustrated) in the camera control unit B 102 and executing the same. This process is started when the first process for accessory mounting (FIG. 11) has been started.

In step S501, the camera control unit B 102 stands by until it is notified of accessory information by the camera control unit A 101. This accessory information is the one provided in the step S408 in FIG. 11. Upon receiving the accessory information, the process proceeds to step S502, in which the camera control unit B 102 in turn configures the function signals (FNC1 to FNC4) based on the received accessory information.

For example, when the accessory information indicates that the accessory 200 is a microphone, the camera control unit B 102 configures the FNC1 signal such that it functions as a clock signal for audio data. Likewise, the camera control unit B 102 configures the FNC2 signal and the FNC3 signal such that they function as a channel signal for audio data and an audio signal, respectively.

In another example, when the accessory information indicates that the accessory 200 is a strobe, the camera control unit B 102 may configure the FNC4 signal such that it functions as a strobe firing synchronization signal (strobe firing timing signal). It should be noted that functions that need not be controlled for the accessory 200 may be configured such that they do not interfere with operation of the camera 100 and the accessory 200.

In step S503, the camera control unit B 102 sets a control logic for the CS signal in SPI communication based on the accessory information of which it was notified by the camera control unit A 101. In step S504, the camera control unit B 102 stands by until an event for the accessory 200 occurs (is detected), and when the event occurs, the process proceeds to step S505.

In the step S505, the camera control unit B 102 determines whether or not the event detected in the step S504 is an event that requires SPI communication with the accessory 200. When the camera control unit B 102 determines that the detected event is an event that requires SPI communication, the process proceeds to step S506, and when the camera control unit B 102 determines that the detected event is an event that does not require SPI communication, the process proceeds to step S507.

In the step S506, the camera control unit B 102 performs SPI communication control for the accessory 200. When the accessory 200 is a microphone, examples of the SPI communication control include communication of an instruction for turning on-off a microphone operation, communication of an instruction for switching sound collecting orientations of the microphone, and communication of an instruction for switching equalizer functions of the microphone. When the accessory 200 is a strobe, examples of the SPI communication control include communication of an instruction for reading setting information about the strobe and communication of an instruction for notifying the strobe of the setting information. After the camera control unit B 102 carries out the process in the step S506, the process returns to the step S504.

In the step S507, the camera control unit B 102 determines whether or not the detected event is an event that requires control for the accessory 200 using function signals. When the camera control unit B 102 determines that the detected event is an event that requires control using function signals, the process proceeds to step S508, and when the camera control unit B 102 determines that the detected event is not an event that requires control using function signals, the process proceeds to step S509.

In the step S508, the camera control unit B 102 performs control for the accessory 200 using function signals. When the accessory 200 is a microphone, examples of the control performed using function signals include starting output of FNC1 which is the clock signal for audio data and output of FNC2 which is the channel signal for audio data and capturing FNC3 which is the audio data signal. This enables the camera 100 to obtain audio data from the accessory 200. When the accessory 200 is a strobe, examples of the control performed using function signals also include controlling FNC4 which is the strobe firing synchronization signal with predetermined timing. This enables the camera 100 to notify the flash strobe of an instruction to fire a flash. After the camera control unit B 102 carries out the process in the step S508, the process returns to the step S504.

In the step S509, the camera control unit B 102 performs "other control" according to the event detected in the step S504. In the other control, when the detected event is an event that requires I2C communication, the camera control unit B 102 performs I2C communication control for the accessory 200. In the other control, the camera control unit B 102 also performs in-camera control according to the detected event. When the accessory 200 is a microphone, examples of the in-camera control performed here include control to start or finish recording audio data on the recording memory 126 and control to carry out an equalizer process on audio data. When the accessory 200 is a strobe, examples of the in-camera control also include photometric control to obtain light emitted by the strobe and accumulated on the image pickup sensor 122, and calculation control to calculate a value indicating the light emitting amount of the strobe. After the camera control unit B 102 carries out the process in the step S509, the process returns to the step S504.

Figure 13:
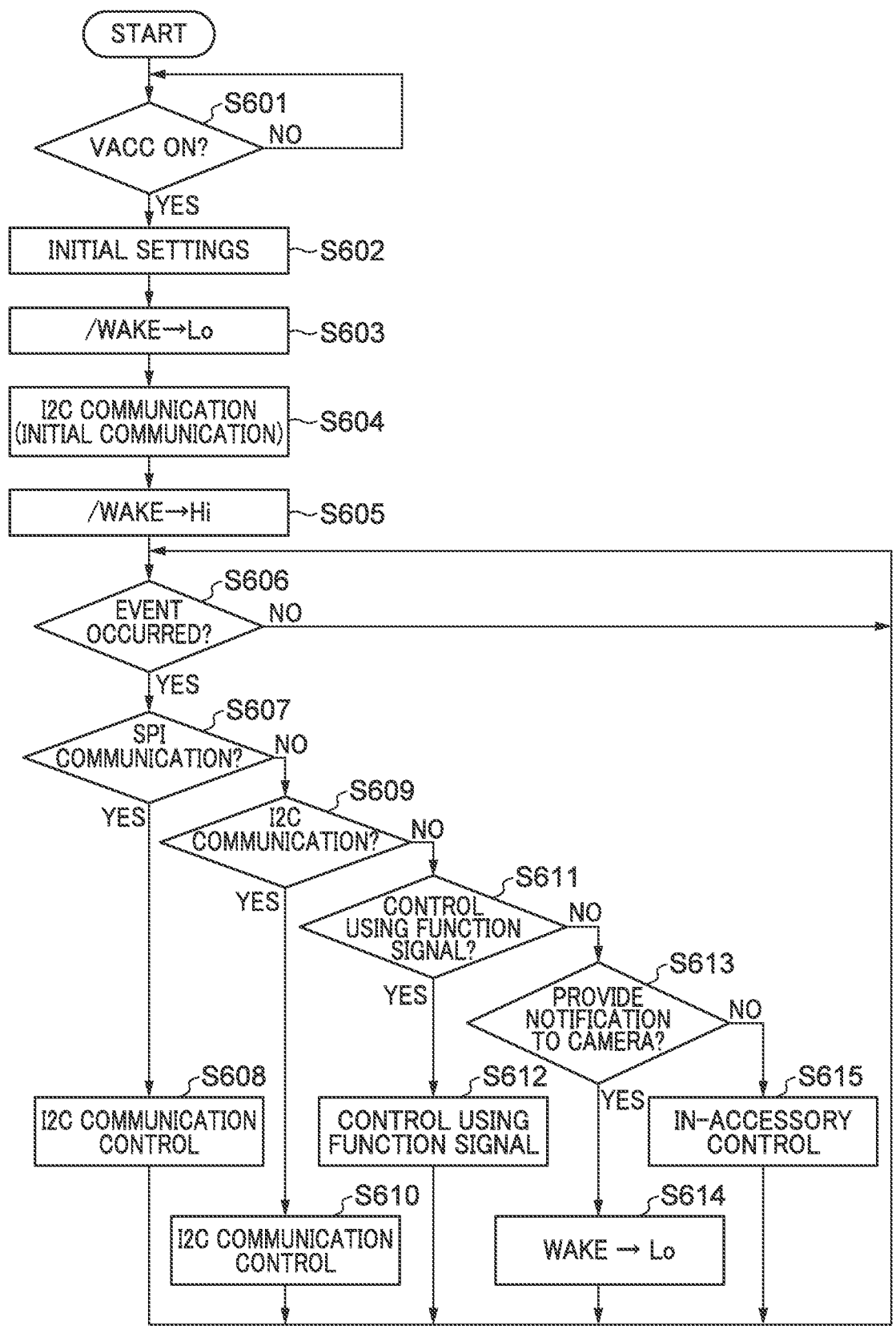
FIG. 13 is a flowchart illustrating a process for accessory mounting.

FIG. 13 is a flowchart illustrating a process for accessory mounting. This flowchart illustrates a process carried out by the accessory control unit 201 while the accessory 200 is mounted on the camera 100 and then functions of the accessory 200 are activated. This process is implemented by the CPU (which is not illustrated) in the accessory control unit 201 loading a program stored in the ROM (which is not illustrated) in the accessory control unit 201 to the RAM (which is not illustrated) in the accessory control unit 201 and executing the same. This process is started when the accessory 200 is mounted on the camera 100.

It should be noted that in the processes in FIGS. 11 and 12, the camera-side connection unit 141, the camera control unit A 101, and the camera control unit B 102 function as a communication unit of the present invention in cooperation with one another. The camera control unit A 101 function as an obtaining unit, a determination unit, and a control unit of the present invention.

In step S601, the accessory control unit 201 stands by until the accessory power supply VACC from the camera 100 is turned on, and when the accessory power supply VACC from the camera 100 is turned on, the process proceeds to step S602. It should be noted that as an alternative to this method, the accessory 200 may be configured to have the battery 205, and also the accessory control unit 201 may be configured to monitor the voltage value of the accessory power supply VACC and detect turning-on of the accessory power supply VACC. It should be noted that if the accessory 200 is not configured to have the battery 205, it may be determined that the accessory power supply VACC has been turned on because power has been supplied to the accessory control unit 201 and then the accessory control unit 201 itself has started operating.

In the step S602, the accessory control unit 201 makes initial settings. The initial settings include a setting on the operating frequency of a microcomputer, a setting on an input-output control port of the microcomputer, an initialization setting on a timer function of the microcomputer, an initialization setting on an interrupt function of the microcomputer, and so forth. In step S603, by controlling the communication request signal/WAKE to the low level (Lo), the accessory control unit 201 notifies the camera 100 that the initial settings have been made (communication has become possible).

In step S604, the accessory control unit 201 sends accessory information of 15 bytes (FIG. 6) in response to I2C communication which is initial communication from the camera 100. In step S605, the accessory control unit 201 controls the communication request signal/WAKE to the high level (Hi). In step S606, the accessory control unit 201 stands by until an event occurs (is detected), and when the event has occurred, the process proceeds to step S607. Thus, the accessory information is sent during the first communication after notification of the information indicating that communication is possible, before an event-based operation is started.

In the step S607, the accessory control unit 201 determines whether or not the event detected in the step S606 is an event that requires I2C communication with the camera 100. When the accessory control unit 201 determines that the detected event is an event that requires I2C communication, the process proceeds to step S608, and when the accessory control unit 201 determines that the detected event is an event that does not require I2C communication, the process proceeds to step S609.

In the step S608, the accessory control unit 201 performs SPI communication control to control SPI communication with the camera 100. When the communication request signal/WAKE is output at the low level while the SPI communication control is performed, the accessory control unit 201 controls the communication request signal/WAKE to be output at the high level after SPI communication.

When the accessory 200 is a microphone, examples of the SPI communication control performed in the step S608 include communication of an instruction for turning on-off a microphone operation. Examples of the SPI communication also includes communication of an instruction for switching sound collecting orientations of the microphone, and communication of an instruction for switching microphone's equalizer functions. When the accessory 200 is a strobe, examples of the SPI communication control include communication that reads setting information on the strobe and communication that notifies the strobe of the setting information. After the accessory control unit 201 carries out the process in the step S608, the process returns to the step S606.

In the step S609, the accessory control unit 201 determines whether or not the detected event is an event that requires I2C communication with the camera 100. When the accessory control unit 201 determines that the detected event is an event that requires I2C communication, the process proceeds to step S610, and when the accessory control unit 201 determines that the detected event is an event that does not require I2C communication, the process proceeds to step S611.

In the step S610, the accessory control unit 201 performs I2C communication control to control I2C communication with the camera 100. When the communication request signal/WAKE is output at the low level while the SPI communication control is performed, the accessory control unit 201 controls the communication request signal/WAKE to be output at the high level after SPI communication. Examples of the I2C communication control performed in the step S610 include communication that reads a cause to request the communication corresponding to the communication request signal/WAKE of which the camera 100 was notified by the accessory control unit 201. After the accessory control unit 201 carries out the process in the step S610, the process returns to the step S606.

In the step S611, the accessory control unit 201 determines whether or not the event detected step S606 is an event that performs control using function signals. When the detected event is an event that requires control using function signals, the process proceeds to step S612, and when the detected event is not an event that requires control using function signals, the process proceeds to step S613.

In the step S612, the accessory control unit 201 performs control for the camera 100 using function signals. When the accessory 200 is a microphone, examples of the control performed in the step S612 using function signals include control described below.

Examples of the control performed in the step S612 include control to receive FNC1 i.e., the clock signal for audio data and FNC2 i.e., the channel signal for audio data channel signal, which are output from the camera 100, and control to output FNC3 i.e., audio data in synchronization with the above signals. On the other hand, when the accessory 200 is a strobe, examples of the control performed using function signals in the step S612 include controlling strobe firing by performing control to receive FNC4 which is the strobe firing synchronization signal. After the accessory control unit 201 carries out the process in the step S612, the process returns to the step S606.

In the step S613, the accessory control unit 201 determines whether or not the event detected in step S606 is an event that requires notification to the camera 100 using the communication request signal/WAKE. When the accessory control unit 201 determines that the detected event is an event that requires notification to the camera 100 using the communication request signal/WAKE, the process proceeds to step S614. On the other hand, when the accessory control unit 201 determines that the detected event is an event that does not require notification to the camera 100 using the communication request signal/WAKE, the process proceeds to step S615.

In the step S614, the accessory control unit 201 stores the cause number of a communication request for the camera 100, which corresponds to the event detected in the step S606, in an unillustrated volatile memory of the accessory 200 and controls the communication request signal/WAKE to the low level (Lo). The cause number of a communication request is one of unique numbers assigned to respective cause details as described earlier with reference to FIG. 9. After the accessory control unit 201 carries out the process in the step S614, the process returns to the step S606.

In the step S615, the accessory control unit 201 performs in-accessory control according to the event detected in the step S606. When the accessory 200 has the battery 205, examples of the in-accessory control performed in the step S615 include control to detect the battery remaining level and control to detect the operation switches 212. After the accessory control unit 201 carries out the process in the step S615, the process returns to the step S606.

It should be noted that the process in FIG. 13 is ended when, for example, the main power to the camera 100 has been turned off, the camera 100 has shifted into the auto-off mode, or when the accessory 200 has been removed from the camera 100.

As described above, through the processes in FIGS. 11, 12, and 13, the camera 100 is able to control the mounted accessory 200, and the accessory 200 is able to perform functional operations.

Figure 14:
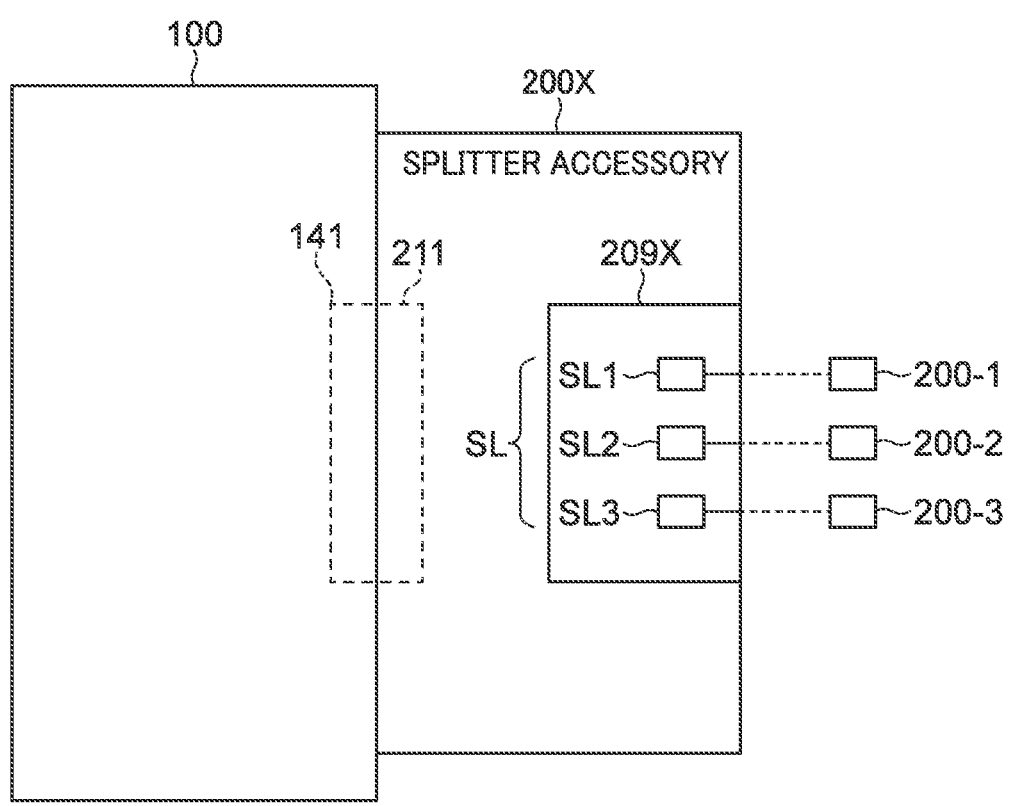
FIG. 14 is a view illustrating a state where a splitter accessory has been mounted on the camera.

FIG. 14 is a view illustrating a state where a splitter accessory has been mounted on the camera 100. The splitter accessory 200X in FIG. 14 as well as a microphone and a strobe is mountable as one of accessories on the camera-side connection unit 141, which is a mount (an attachment part to which an accessory is attachable) in the camera 100.

The splitter accessory 200X is an accessory connector (multi-accessory connection adapter) on which two or more accessories are mountable. A basic arrangement of the splitter accessory 200X in terms of connection to the camera 100 is the same as that of the accessory 200. Accordingly, the splitter accessory 200X includes the accessory-side connection unit 211, which is connected to (mounted on) the camera-side connection unit 141, and the accessory control unit 201. It should be noted that the splitter accessory 200X includes an external connection terminal 209X equivalent to the external connection terminal 209.

The external connection terminal 209X includes a plurality of slots SL (SL1 to SL3) having the same terminals as those of the camera-side connection unit 141. Although in the example illustrated in FIG. 14, there are three slots, there may be two slots or four or more slots. Each of the slots SL is configured such that one accessory is mountable thereon. While the camera-side connection unit 141 functions as a first mount on which one accessory is mountable (a first attachment part to which one accessory is attachable), the external connection terminal 209X functions as a second mount on which two or more (a plurality of) accessories are mountable (a second attachment part to which two or more accessories are attachable). The external connection terminal 209X is configured such that a variety of accessories each equipped with the accessory-side connection unit 211 are mountable thereon, and shooting accessories such as a microphone and a strobe are also mountable on the external connection terminal 209X. The accessories 200 mounted on the slots SL1, SL2, and SL3 are referred to accessories 200-1, 200-2, and 200-3, respectively.

As described above, the camera 100 carries out I2C communication (first communication) with an accessory mounted on the camera-side connection unit 141 and also carries out SPI communication (second communication) with the accessory according to the result of I2C communication. Here, SPI communication is a higher speed communication mode than I2C communication. When the splitter accessory 200X has been mounted on the camera-side connection unit 141, the camera 100 communicates with the accessories 200-1, 200-2, and 200-3 mounted on the slots SL of the splitter accessory 200X. On this occasion, the camera 100 performs I2C communication with the accessories 200-1, 200-2, and 200-3 and also performs SPI communication with the accessories 200-1, 200-2, and 200-3 according to the result of I2C communication, via the splitter accessory 200X. In other words, the camera 100 communicates via the camera-side connection unit 141 with the accessories 200-1, 200-2, and 200-3 through the I2C communication and SPI communication between the splitter accessory 200X and the camera 100.

That is, after the splitter accessory 200X has been mounted on the camera-side connection unit 141, the splitter accessory 200X carries out I2C communication and SPI communication with the camera 100, to establish communication between two or more accessories, which are mounted on the splitter accessory 200X itself, and the camera 100, via the camera-side connection unit 141, through the I2C communication and the SPI communication.

As described above, the camera 100 obtains accessory information about the accessory 200 (including the splitter accessory 200X), which is mounted on the camera-side connection unit 141, from the accessory 200 through I2C communication. Moreover, when the splitter accessory 200X has been mounted on the camera-side connection unit 141, the camera 100 obtains accessory information about each of the accessories 200-1, 200-2, and 200-3 mounted on the respective slots SL (SL1 to SL3), from the accessories via the splitter accessory 200X through I2C communication.

Figure 15:
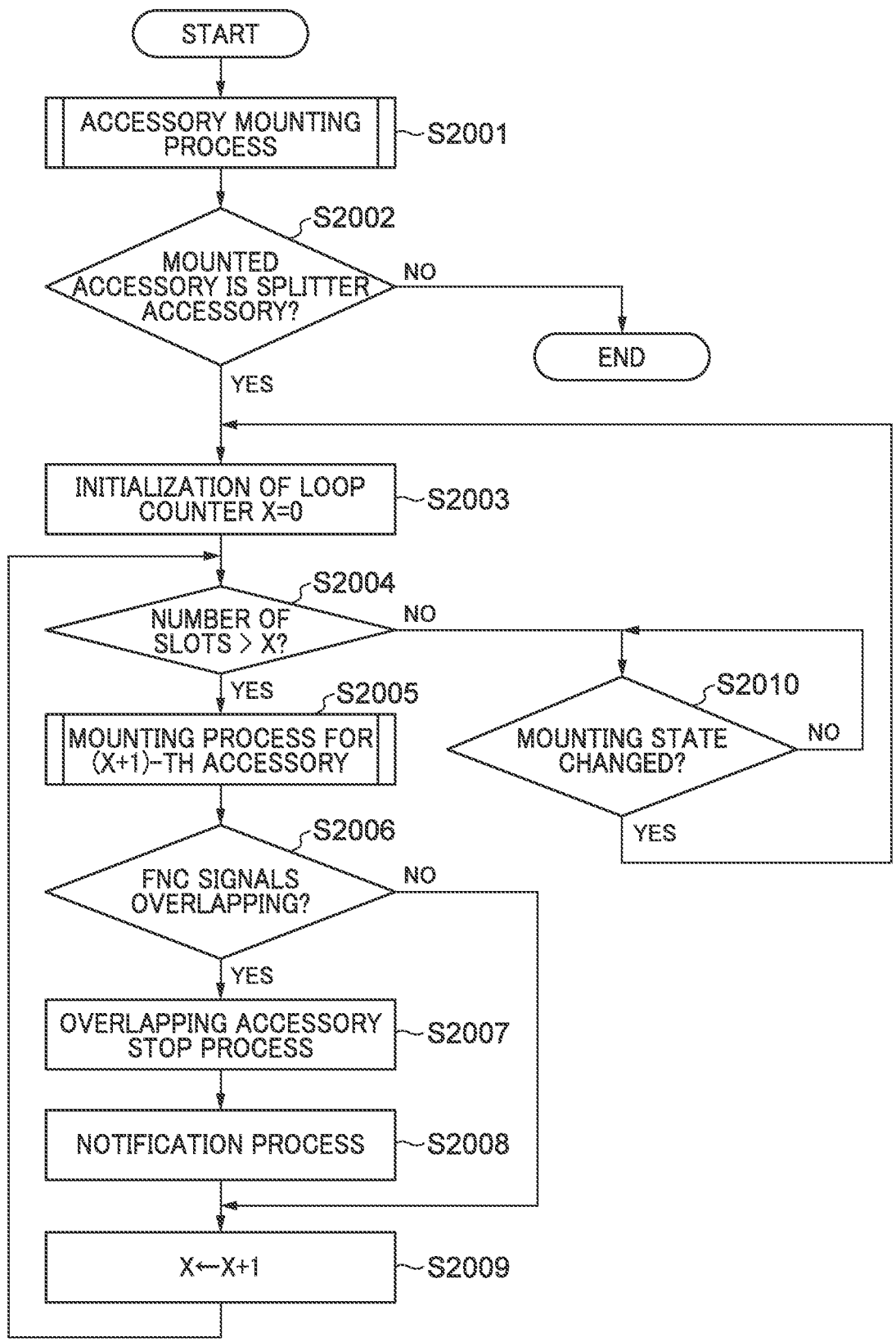
FIG. 15 is a flowchart illustrating a main process for accessory mounting.

FIG. 15 is a flowchart illustrating a main process for accessory mounting. This flowchart illustrates a process that is carried out by the camera 100 until functions of the accessory 200 mounted on the camera 100 (including the case where the splitter accessory 200X has been mounted) or the accessories 200 mounted on the splitter accessory 200X are activated. The main process is implemented by the CPU (which is not illustrated) in the camera control unit A 101 loading a program stored in the ROM (which is not illustrated) in the camera control unit A 101 to the RAM (which is not illustrated) in the camera control unit A 101 and executing the same. This main process is started when the main power to the camera 100 has been turned on or when the camera 100 has returned from the auto-off mode.

In step S2001, the camera control unit A 101 carries out the first process for accessory mounting (FIG. 11). It should be noted that when the camera control unit B 102 is notified of accessory information in the step S408 in FIG. 11 in the step S2001, the second process for accessory mounting (FIG. 12) is carried out by the camera control unit B 102.

In step S2002, the camera control unit A 101 determines whether or not the accessory mounted on the camera 100 is the splitter accessory 200X. The determination is made based on accessory type information indicated by D7-D0 data at the address 0x00 in the accessory information (FIG. 6). Alternatively, the determination can be made by adding a specific value indicating the splitter accessory 200X to the accessory identification numbers indicated by the accessory type information indicated by D7-D0 data at the address 0x01. Alternatively, the determination can be made by adding information that identifies the splitter accessory 200X into a reserved area.

It should be noted that in the step S2002, when the accessory mounted on the camera 100 is not the splitter accessory 200X, the camera control unit A 101 ends the process in FIG. 15. This case is the same as the case where the normal accessory 200 has been mounted on the camera 100 as described above with reference to FIGS. 11 to 13. On the other hand, when the splitter accessory 200 mounted on the camera 100 is the splitter accessory 200X, the camera control unit A 101 obtains the number of slots in the splitter accessory 200X, followed by the process proceeding to step S2003.

The processes in the steps S2003 to S2010 is collectively referred to as an "overlap adjustment process". In the step S2003, the camera control unit A 101 initializes the count value X of a loop counter to "0". The loop counter is a counter for carrying out the processes in the steps S2005 to S2008 on the plurality of slots SL. It should be noted that another counter may be used as long as it is able to count the number of slots to be processed.

In the step S2004, the camera control unit A 101 determines whether or not the number of slots is greater than the count value X (the number of slots >X).

Here, the fulfillment of "the number of slots >X" is a condition for repeating a loop including a set of the processes in the steps S2005 to S2009. When "the number of slots >X" holds, the process proceeds to the step S2005.

In the step S2005, the camera control unit A 101 carries out a mounting process for the accessory 200 mounted on the (X+1)-th slot among the plurality of slots SL. That is, the camera control unit A 101 carries out the first process for accessory mounting (FIG. 11). It should be noted that when the camera control unit B 102 is notified of accessory information in the step S408 in FIG. 11 in the step S2005, the second process for accessory mounting (FIG. 12) is carried out by the camera control unit B 102. It should be noted that the order in which the mounting process for the external connection terminal 209X is carried out is determined in advance, and is in the order of the slots SL1, the SL2, and SL3. For example, in the first execution of the loop, the (X+1)-th accessory means the first accessory, and hence the mounting process for an accessory mounted on the slots SL1 is carried out.

In the step S2006, in a case where the number of accessories for which the mounting process was carried out in the step S2005 is equal to or greater than two, the camera control unit A 101 determines whether or not there are any accessories that have functions overlapping each other (hereafter referred to as overlapping functions). This determination is made based on accessory information (FIG. 6) of each of the two or more accessories.

Specifically, the camera control unit A 101 reads function signals (FNC signals) in D3-D0 data at the address 0x06 and determines whether or not the function signals of the two or more accessories overlap each other. The function signals are defined by a bit field, and hence if positions at which a bit is set overlap, it means that there are overlapping functions. It is determined that accessories with overlapping function signals among FNC1 to FNC4 are accessories with overlapping functions (hereafter referred to as overlapping accessories). For example, an accessory with FNC1, FNC2, and FNC3 being available and an accessory with FNC2 and FNC3 being available overlap in FNC3, and hence it is determined that they are overlapping accessories. When there are no overlapping function signals, the camera control unit A 101 executes functions that maintain communications with respective accessories.

In step S2007, the camera control unit A 101 carries out an overlapping accessory stop process, which restricts an overlapping function of at least one of the overlapping accessories. In this overlapping accessory stop process, the camera control unit A 101 blocks communication with at least one of the overlapping accessories, and more preferably, maintains communication with at least one of the overlapping accessories. Namely, the accessory control unit A 101 of an accessory with which communication has been blocked does not perform control to execute functions of the function unit 206 which is the main body of the accessory. There are various examples of the overlapping accessory stop process as described below.

First, as for blocking of communication, when the accessories are carrying out SPI communications (S506) or I2C communications (S405, S509), the camera 100 stops those communications with at least one of the overlapping accessories. In the step S407, the camera control unit A 101 changes the power supply control signal CNT_VACC2, which was changed to the high level in the step S407, to the low level, and the camera control unit A 101 also changes the power supply control signal CNT_VACC1, which was changed to the high level in the step S402, to the low level. As a result, the supply of power to at least one of the overlapping accessories is turned off.

It should be noted that communication with all or part of the overlapping accessories may be blocked. Moreover, all of communications may not be blocked, but only communication relating to overlapping functions may be blocked so as to prevent the overlapping functions from being executed. To block communication with part of the overlapping accessories, accessories with which communication will be blocked can be determined based on a predetermined rule. It should be noted that the times at which the accessories are mounted on the respective slots SL are stored so that at least the camera 100 can keep track of them.

The camera control unit A 101 may first determine one of the overlapping accessories with a smaller or lager slot SL number as an accessory with which communication will be blocked.

Alternatively, based on the order in which accessories were mounted on the external connection terminal 209X, the camera control unit A 101 may determine an accessory with which communication will be blocked. For example, the camera control unit A 101 may determine an accessory mounted first or second between the overlapping accessories as an accessory with which communication will be blocked. When an accessory mounted second between the overlapping accessories is determined as an accessory with which communication will be blocked (first-come first-served basis), the behaviors of an accessory that has already started operating are not interfered with. On the other hand, when an accessory mounted first between the overlapping accessories is determined as an accessory with which communication will be blocked (last-come first-served basis), an accessory that is likely to be used intentionally by a user can be quickly made available. The camera 100 may be user-configurable to block (or not block) communications with an accessory mounted on a specified slot, an accessory mounted first on any slot, or an accessory mounted later on any slot.

In addition, an accessory with which communication will be blocked may be determined based on the accessory information. For example, by referring to requested power information indicated by D3-D0 (FIG. 6) at the address 0x04, an accessory to which power is not supplied by the camera 100 may be determined as an accessory with which communication will be blocked. The rules described above may be used in combination.

In step S2008, the camera control unit A 101 carries out a notification process. In this notification process, for example, a message that identifies an accessory with which communication has been blocked is displayed on the display unit 127. On this occasion, it may be displayed on a GUI by updating a GUI display area of the volatile memory 125. It should be noted that the notification may be provided not only by displaying a message in text or displaying an icon but also using sound. The notification process enables a user to recognize that a connected accessory is not available.

It should be noted that the splitter accessory 200X may be provided with a notification unit such as a display unit, and in the notification process, either or both of the camera 100 and the splitter accessory 200X may provide notification about an accessory with which communication has been blocked.

It should be noted that when providing the notification, the camera control unit A 101 may inform a user about how to end the overlapping state. For example, the camera control unit A 101 may present a user information that identifies overlapping accessories to inform the user which accessory should be removed so that the rest of the accessories become available.

It should be noted that the camera control unit A 101 may carry out the notification process before the overlapping accessory stop process. In this case, the camera control unit A 101 may notify a user that there are overlapping accessories and prompt the user to choose an accessory with which communication will be actually blocked.

In step S2009, the camera control unit A 101 increments the count value X of the loop counter, followed by the process returning to the step S2004. In the step S2004, when "the number of slots >X" does not hold, the camera control unit A 101 determines that processes for a maximum number of slots SL which the splitter accessory 200X have been carried out. Accordingly, in the step S2010, the camera control unit A 101 stands by until there is a change in the state in which accessories are mounted on the respective slots SL of the splitter accessory 200X. While there is no change in the state in which accessories are mounted, the accessories mounted on the splitter accessory 200X except for the stopped accessory are available.

When there is a change in the state in which the accessories are mounted on the respective slots SL of the splitter accessory 200X, the process returns to the step S2003. Thus, when a new accessory has been mounted on the external connection terminal 209X during repetition of the loop in the step S2010, causing a new overlap, one of the accessories is stopped so as to correct for the overlap.

The process illustrated in FIG. 15 is ended, for example, when the main power to the camera 100 has been turned off, when the camera 100 has shifted into the auto-off mode (power-saving mode), or when the splitter accessory 200X has been removed.

It should be noted that the process in FIG. 15 should not necessarily have the step S2010; when the determination result is negative (NO) in the step S2004, the process in FIG. 15 may be ended.

According to the present embodiment, when a plurality of accessories has been mounted on the splitter accessory 200X mounted on the camera-side connection unit 141 (attachment part), the camera control unit A 101 determines whether or not overlapping accessories that have functions overlapping each other are found, based on the accessory information (S2006). In a case where it is determined that there are overlapping accessories, communication with at least one of the overlapping accessories is blocked. This prevents two or more accessories 200 with overlapping functions from being used at the same time. As a result, occurrence of malfunctions is prevented even when a plurality of accessories has been mounted on the camera 100. Particularly when all of the plurality of accessories 200 mounted on the camera 100 are not available properly at the same time, communication with only one of the overlapping accessories is maintained to ensure that it is available properly.

Moreover, when a user is notified of an accessory with which communication will be blocked among the overlapping accessories, the user can recognize whether or not a mounted accessory can be effectively used.

Figure 16:
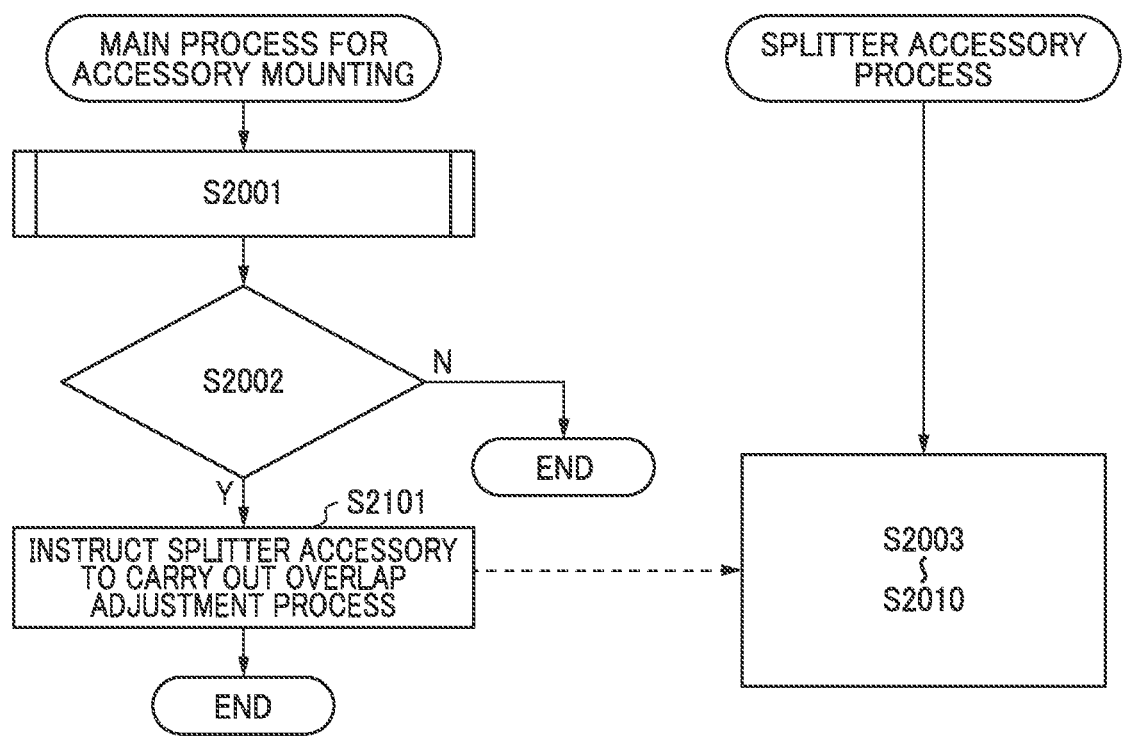
FIG. 16 is a flowchart illustrating a main process for accessory mounting and a splitter accessory process in association with each other.

It should be noted that the overlap adjustment process (S2003 to S2010) is carried out by the camera 100, but as illustrated in a variation in FIG. 16, it may be carried out by the splitter accessory 200X.

FIG. 16 is a flowchart illustrating a main process for accessory mounting and a splitter accessory process in association with each other. What carries out the main process for accessory mounting and a starting condition for the main process are the same as those in the process illustrated in FIG. 15. The splitter accessory process is implemented by the CPU (which is not illustrated) in the accessory control unit 201 loading a program stored in the ROM (which is not illustrated) in the accessory control unit 201 to the RAM (which is not illustrated) in the accessory control unit 201 and executing the same.

The steps S2001 and S2002 in the main process for accessory mounting are executed by the camera 100 as described earlier with reference to FIG. 16. When the determination result is positive (YES) in the step S2002, the process proceeds to step S2101.

In the step S2101, the camera control unit A 101 sends the splitter accessory 200X an instruction to carry out the overlap adjustment process and ends the main process for accessory mounting. The accessory control unit 201 of the splitter accessory 200X then carries out the same process as in the steps S2003 to S2010 in the splitter accessory process.

This arrangement can prevent a plurality of accessories with overlapping functions from being used at the same time. It should be noted that in the notification process (S2008) in the process illustrated in FIG. 16, either or both of the camera 100 and the splitter accessory 200X may provide notification of an accessory with which communication has been blocked.

It should be noted that the present invention may be applied to a camera system in which the camera 100 and the splitter accessory 200X are integrated together (in one body)

in advance. In this case, the camera system may be referred to as an image pickup apparatus. It should be noted that the camera 100 should not necessarily have the built-in accessories 151 and 152 incorporated therein. Moreover, although in the above description, the electronic apparatus is an image pickup apparatus, the electronic apparatuses according to the present invention include a variety of electronic apparatus other than an image pickup apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073486 filed on Apr. 23, 2021 which is hereby incorporated by reference herein in its entirety.

What is claimed is:

1. An electronic apparatus comprising:
    an attachment part to which an accessory is attachable and to which an accessory connector is attachable, a plurality of accessories being attachable to the accessory connector; and
    a controller configured to:
    when a plurality of accessories has been attached to the accessory connector attached to the attachment part, obtain via the attachment part, accessory information of each of the plurality of accessories attached to the accessory connector; and
    in a case where overlapping accessories that have functions overlapping each other are found among the plurality of accessories based on the accessory information, restrict a function of at least one of the overlapping accessories, overlapping a function of another of the overlapping accessories.

2. The electronic apparatus according to claim 1, wherein the controller is further configured to, in the case where the overlapping accessories are found, stop communication via the attachment part with the at least one of the overlapping accessories.

3. The electronic apparatus according to claim 2, wherein the controller is further configured to maintain communication via the attachment part with one of the overlapping accessories.

4. The electronic apparatus according to claim 1, wherein the accessory information includes a function signal indicating a function which an accessory has.

5. The electronic apparatus according to claim 4, wherein the function signal is defined by a bit field.

6. The electronic apparatus according to claim 1, wherein the controller is further configured to provide notification of an accessory among the overlapping accessories, having a function that overlaps a function of another of the overlapping accessories and is not to be executed.

7. The electronic apparatus according to claim 1, wherein the controller is further configured to provide notification that there are accessories that have functions overlapping each other.

8. The electronic apparatus according to claim 1, wherein the controller is further configured to, in the case where the overlapping accessories are found, determine an accessory having a function that overlaps a function of another of the overlapping accessories and is not to be executed based on an order in which the overlapping accessories were attached on the accessory connector.

9. The electronic apparatus according to claim 1, wherein the controller is further configured to, after the accessory connector is attached to the attachment part, communicate via the attachment part with the plurality of accessories attached to the accessory connector through a first communication and a second communication faster than the first communication between the accessory connector and the electronic apparatus.

10. The electronic apparatus according to claim 9, wherein the first communication is a communication using SPI (Serial Peripheral Interface), and the second communication is a communication using I2C (Inter-Integrated Circuit).

11. The electronic apparatus according to claim 1, wherein the controller is further configured to, in a case where overlapping accessories that have functions overlapping each other are not found among the plurality of accessories, executes functions of the plurality of accessories.

12. The electronic apparatus according to claim 1, wherein the attachment part is an accessory shoe.

13. An accessory capable of being attached to an electronic apparatus according to claim 1, the accessory comprising:
    an accessory main body that executes a function of the accessory;
    a plurality of contacts for a communication between the accessory and the electronic apparatus to which the accessory has been attached; and
    an accessory controller configured to:
    output information indicating one of the plurality of contacts, to be used in execution of the function of the accessory, via another of the plurality of contacts, being different from a contact indicated by the information.

14. An electronic apparatus comprising:
- an attachment part to which a plurality of accessories is attachable; and
- a controller configured to:
- obtain via the attachment part, accessory information of an accessory attached to the attachment part; and
- in a case where a plurality of accessories has been attached to the attachment part and overlapping accessories that have functions overlapping each other are found among the plurality of accessories based on the accessory information, restrict a function of at least one of the overlapping accessories, overlapping a function of another of the overlapping accessories.

15. The electronic apparatus according to claim 14, wherein the attachment part is an accessory shoe.

16. An accessory capable of being attached to an electronic apparatus according to claim 14, the accessory comprising:
- an accessory main body that executes a function of the accessory;
- a plurality of contacts for a communication between the accessory and the electronic apparatus to which the accessory has been attached; and
- an accessory controller configured to:
- output information indicating one of the plurality of contacts, to be used in execution of the function of the accessory, via another of the plurality of contacts, being different from a contact indicated by the information.

* * * * *